United States Patent
Ram et al.

(10) Patent No.: US 11,341,539 B2
(45) Date of Patent: May 24, 2022

(54) OFFER SELECTION USING SEQUENTIAL SELECTION OPERATIONS

(71) Applicant: NICE LTD., Ra'anana (IL)

(72) Inventors: Tomer Ram, Netanya (IL); Moshe Hadad, Rosh Haayin (IL); Ofir Ventura, Barkan (IL)

(73) Assignee: NICE LTD., Ra'anana (IL)

( * ) Notice: Subject to any disclaimer, the term of this patent is extended or adjusted under 35 U.S.C. 154(b) by 670 days.

(21) Appl. No.: 15/294,866

(22) Filed: Oct. 17, 2016

(65) Prior Publication Data
US 2018/0108045 A1 Apr. 19, 2018

(51) Int. Cl.
*G06Q 30/02* (2012.01)
*G06N 20/00* (2019.01)

(52) U.S. Cl.
CPC ......... *G06Q 30/0269* (2013.01); *G06N 20/00* (2019.01); *G06Q 30/02* (2013.01)

(58) Field of Classification Search
CPC .................................................. G06Q 30/00
USPC .......................................................... 705/14
See application file for complete search history.

(56) References Cited

U.S. PATENT DOCUMENTS

| | | | | |
|---|---|---|---|---|
| 6,546,379 B1* | 4/2003 | Hong | .................... | G06K 9/6256 706/14 |
| 2002/0032645 A1* | 3/2002 | Nozaki | ................ | G06Q 10/067 705/38 |
| 2005/0261881 A1* | 11/2005 | Jackson | .................. | G06F 17/50 703/1 |
| 2011/0026839 A1* | 2/2011 | Bogart | ..................... | G06T 11/60 382/217 |
| 2011/0157226 A1* | 6/2011 | Ptucha | ..................... | G06T 11/60 345/638 |
| 2012/0226700 A1* | 9/2012 | Chang | ................ | G06Q 30/0251 707/748 |
| 2014/0114758 A1* | 4/2014 | Bentley | .............. | G06Q 30/0254 705/14.53 |

(Continued)

OTHER PUBLICATIONS

13. L. Wang, J. J. Lin, and D. Metzler. A cascade ranking model for efficient ranked retrieval. In ACM Conference on Research and Development in Information Retrieval (SIGIR), pp. 105-114, 2011. (Year: 2011).*

(Continued)

*Primary Examiner* — Eric R Netzloff
(74) *Attorney, Agent, or Firm* — Pearl Cohen Zedek Latzer Baratz LLP

(57) ABSTRACT

A combination of two or more offers may be selected from a plurality of offers to be served to potential respondents, in a method performed using one or more processors in a computing system. The method of selecting may comprises receiving a request for a selection of a combination of two or more offers from the sets of offers; in response to the request: performing a series of selection operations each resulting in the selection of one offer to be included in the combination, each selection operation being carried out according to a respective model including one or more variables. The variables of the model for the second and any subsequent selection operation may include at least one selected offer from a previous selection operation. A signal identifying the selected offers may be output to cause the combination of the selected offers to be served to a respondent.

16 Claims, 14 Drawing Sheets

(56) References Cited

U.S. PATENT DOCUMENTS

| | | | |
|---|---|---|---|
| 2015/0220972 A1* | 8/2015 | Subramanya | G06Q 30/0246 |
| | | | 705/14.45 |
| 2015/0262220 A1* | 9/2015 | Zhang | G06Q 30/0244 |
| | | | 705/14.43 |
| 2016/0124918 A1* | 5/2016 | Ying | G06F 16/9535 |
| | | | 715/234 |
| 2016/0189176 A1 | 6/2016 | Newnham | |
| 2017/0011414 A1 | 1/2017 | Newnham | |
| 2017/0094058 A1 | 3/2017 | Piaggio et al. | |
| 2017/0195487 A1 | 7/2017 | Bellosi et al. | |
| 2017/0262770 A1* | 9/2017 | Purdy | B60W 40/09 |
| 2017/0278018 A1* | 9/2017 | Mnih | G06N 3/08 |

OTHER PUBLICATIONS

Richard S. Sutton & Andrew G. Barto "Reinforcement Learning: An Introduction" The MIT Press, Cambridge, Massachusetts; London England pp. 1-334; Dec. 2012.

* cited by examiner

| | | |
|---|---|---|
| Variable 1 | Bin 1 | 0 |
| | Bin 2 | 0 |
| | Bin 3 | 0 |
| | Bin 4 | 0 |
| | Bin 5 | 1 |
| | Bin 6 | 0 |
| | Bin 7 | 0 |
| | Bin 8 | 0 |
| | Bin 9 | 0 |
| | Bin 10 | 0 |
| Variable 2 | Bin 1 | 0 |
| | Bin 2 | 0 |
| | Bin 3 | 1 |
| | Bin 4 | 0 |
| | Bin 5 | 0 |
| | Bin 6 | 0 |
| | Bin 7 | 0 |
| | Bin 8 | 0 |
| | Bin 9 | 1 |
| | Bin 10 | 0 |
| Variable 3 | Bin 1 | 0 |
| | Bin 2 | 1 |
| | Bin 3 | 0 |
| | Bin 4 | 0 |
| | Bin 5 | 0 |
| | Bin 6 | 0 |
| | Bin 7 | 0 |
| | Bin 8 | 0 |
| | Bin 9 | 0 |
| | Bin 10 | 0 |
| Sub DE 1 | Missing | 0 |
| | Option 1 | 0 |
| | Option 2 | 0 |
| | Option 3 | 0 |
| | Option 4 | 1 |
| Sub DE 2 | Missing | 1 |
| | Option 1 | 0 |
| | Option 2 | 0 |
| | Option 3 | 0 |
| | Option 4 | 0 |
| Sub DE 3 | Missing | 1 |
| | Option 1 | 0 |
| | Option 2 | 0 |
| | Option 3 | 0 |
| | Option 4 | 0 |

Output=Option 1

| | | | | Option Bias | 0.54 | 0.35 | 0.95 |
|---|---|---|---|---|---|---|---|
| | Global Bias | | 0.75 | | Weights option 1 | Weights option 2 | Weights option 3 |
| DE1 | Variable 1 | Bin 1 | 0 | | 0.65 | 0.01 | 0.88 |
| | | Bin 2 | 0 | | 0.32 | 0.79 | 0.87 |
| | | Bin 3 | 0 | | 0.88 | 0.14 | 0.26 |
| | | Bin 4 | 0 | | 0.47 | 0.04 | 0.17 |
| | | Bin 5 | 1 | | 0.71 | 0.43 | 0.81 |
| | | Bin 6 | 0 | | 0.67 | 0.10 | 0.09 |
| | | Bin 7 | 0 | | 0.97 | 0.67 | 0.05 |
| | | Bin 8 | 0 | | 0.08 | 0.11 | 0.35 |
| | | Bin 9 | 0 | | 0.86 | 0.46 | 0.23 |
| | | Bin 10 | 0 | | 0.39 | 0.08 | 0.17 |
| | Variable 2 | Bin 1 | 0 | | 0.23 | 0.44 | 0.49 |
| | | Bin 2 | 0 | | 0.20 | 0.86 | 0.54 |
| | | Bin 3 | 1 | | 0.87 | 0.28 | 0.80 |
| | | Bin 4 | 0 | | 0.96 | 0.42 | 0.45 |
| | | Bin 5 | 0 | | 0.33 | 0.21 | 0.70 |
| | | Bin 6 | 0 | | 0.52 | 0.55 | 0.94 |
| | | Bin 7 | 0 | | 0.16 | 0.15 | 0.73 |
| | | Bin 8 | 0 | | 0.22 | 0.25 | 0.82 |
| | | Bin 9 | 1 | | 0.68 | 0.36 | 0.17 |
| | | Bin 10 | 0 | | 0.18 | 0.74 | 0.13 |
| | Variable 3 | Bin 1 | 0 | | 0.81 | 0.11 | 0.72 |
| | | Bin 2 | 1 | | 0.57 | 0.63 | 0.64 |
| | | Bin 3 | 0 | | 0.61 | 0.28 | 0.70 |
| | | Bin 4 | 0 | | 0.35 | 0.06 | 0.88 |
| | | Bin 5 | 0 | | 0.15 | 0.47 | 0.26 |
| | | Bin 6 | 0 | | 0.90 | 0.09 | 0.78 |
| | | Bin 7 | 0 | | 0.13 | 0.52 | 0.87 |
| | | Bin 8 | 0 | | 0.04 | 0.53 | 0.39 |
| | | Bin 9 | 0 | | 0.27 | 0.41 | 0.03 |
| | | Bin 10 | 0 | | 0.75 | 0.21 | 0.43 |
| | Sub DE 1 | Missing | 1 | | 0.30 | 0.19 | 0.27 |
| | | Option 1 | 0 | | 0.20 | 0.13 | 0.18 |
| | | Option 2 | 0 | | 0.05 | 0.62 | 0.79 |
| | | Option 3 | 0 | | 0.42 | 0.20 | 1.00 |
| | | Option 4 | 0 | | 0.13 | 0.41 | 0.79 |
| | Sub DE 2 | Missing | 1 | | 0.55 | 0.60 | 0.99 |
| | | Option 1 | 0 | | 0.76 | 0.54 | 0.85 |
| | | Option 2 | 0 | | 0.49 | 0.75 | 0.89 |
| | | Option 3 | 0 | | 0.19 | 0.31 | 0.45 |
| | | Option 4 | 0 | | 0.19 | 0.22 | 0.99 |
| | Sub DE 3 | Missing | 1 | | 0.96 | 0.21 | 0.09 |
| | | Option 1 | 0 | | 0.15 | 0.01 | 0.48 |
| | | Option 2 | 0 | | 0.71 | 0.58 | 0.44 |
| | | Option 3 | 0 | | 0.35 | 0.87 | 0.65 |
| | | Option 4 | 0 | | 0.53 | 0.02 | 0.96 |
| | | | | Results | 4.64 | 2.69 | 3.78 |

FIG. 9B

Output=Option 3

| | | | Option Bias | 0.19 | 0.76 | 0.01 |
|---|---|---|---|---|---|---|
| | Global Bias | | 0.97 | Weights option 1 | Weights option 2 | Weights option 3 |
| DE2 | Variable 1 | Bin 1 | 0 | 0.06 | 0.28 | 0.94 |
| | | Bin 2 | 0 | 0.86 | 0.72 | 0.98 |
| | | Bin 3 | 0 | 0.82 | 0.54 | 0.08 |
| | | Bin 4 | 0 | 0.07 | 0.42 | 0.15 |
| | | Bin 5 | 1 | 0.26 | 0.33 | 0.76 |
| | | Bin 6 | 0 | 0.60 | 0.89 | 0.52 |
| | | Bin 7 | 0 | 0.86 | 0.23 | 0.73 |
| | | Bin 8 | 0 | 0.97 | 0.12 | 0.30 |
| | | Bin 9 | 0 | 0.33 | 0.63 | 0.43 |
| | | Bin 10 | 0 | 0.41 | 0.17 | 0.04 |
| | Variable 2 | Bin 1 | 0 | 0.78 | 0.56 | 0.86 |
| | | Bin 2 | 0 | 0.52 | 0.37 | 0.74 |
| | | Bin 3 | 1 | 0.89 | 0.75 | 0.49 |
| | | Bin 4 | 0 | 0.54 | 0.92 | 0.84 |
| | | Bin 5 | 0 | 0.82 | 0.30 | 0.78 |
| | | Bin 6 | 0 | 0.97 | 0.97 | 0.22 |
| | | Bin 7 | 0 | 0.71 | 0.21 | 0.96 |
| | | Bin 8 | 0 | 0.60 | 0.73 | 0.58 |
| | | Bin 9 | 1 | 0.52 | 0.11 | 0.87 |
| | | Bin 10 | 0 | 0.97 | 0.83 | 0.70 |
| | Variable 3 | Bin 1 | 0 | 0.91 | 0.56 | 0.89 |
| | | Bin 2 | 1 | 0.81 | 0.38 | 0.79 |
| | | Bin 3 | 0 | 0.29 | 0.67 | 0.59 |
| | | Bin 4 | 0 | 0.56 | 0.74 | 0.13 |
| | | Bin 5 | 0 | 1.00 | 0.81 | 0.12 |
| | | Bin 6 | 0 | 0.52 | 0.02 | 0.26 |
| | | Bin 7 | 0 | 0.86 | 0.71 | 0.99 |
| | | Bin 8 | 0 | 0.50 | 0.52 | 0.21 |
| | | Bin 9 | 0 | 0.04 | 0.87 | 0.51 |
| | | Bin 10 | 0 | 0.09 | 0.01 | 0.57 |
| | Sub DE 1 | Missing | 0 | 0.32 | 0.04 | 0.33 |
| | | Option 1 | 1 | 0.68 | 0.50 | 0.69 |
| | | Option 2 | 0 | 0.64 | 0.29 | 0.90 |
| | | Option 3 | 0 | 0.35 | 0.21 | 0.17 |
| | | Option 4 | 0 | 0.48 | 0.73 | 0.55 |
| | Sub DE 2 | Missing | 1 | 0.12 | 0.18 | 0.25 |
| | | Option 1 | 0 | 0.85 | 0.60 | 0.56 |
| | | Option 2 | 0 | 0.21 | 0.55 | 0.04 |
| | | Option 3 | 0 | 0.13 | 0.93 | 0.43 |
| | | Option 4 | 0 | 0.41 | 0.51 | 0.63 |
| | Sub DE 3 | Missing | 1 | 0.44 | 0.45 | 0.92 |
| | | Option 1 | 0 | 0.39 | 0.43 | 0.10 |
| | | Option 2 | 0 | 0.54 | 0.86 | 0.83 |
| | | Option 3 | 0 | 0.63 | 0.61 | 0.82 |
| | | Option 4 | 0 | 0.66 | 0.44 | 0.21 |
| | | Results | | 3.71 | 2.70 | 4.78 |

Output=Option 2

| | | | Option Bias | 0.73 | 0.60 | 0.39 |
|---|---|---|---|---|---|---|
| DE3 | Global Bias | | 0.07 | Weights option 1 | Weights option 2 | Weights option 3 |
| | Variable 1 | Bin 1 | 0 | 0.64 | 0.78 | 0.06 |
| | | Bin 2 | 0 | 0.40 | 0.08 | 0.97 |
| | | Bin 3 | 0 | 0.14 | 0.93 | 0.31 |
| | | Bin 4 | 0 | 0.65 | 0.85 | 0.49 |
| | | Bin 5 | 1 | 0.07 | 0.28 | 0.09 |
| | | Bin 6 | 0 | 0.45 | 0.88 | 0.54 |
| | | Bin 7 | 0 | 0.13 | 0.27 | 0.54 |
| | | Bin 8 | 0 | 0.77 | 0.67 | 0.94 |
| | | Bin 9 | 0 | 0.79 | 0.27 | 0.88 |
| | | Bin 10 | 0 | 0.36 | 0.63 | 0.59 |
| | Variable 2 | Bin 1 | 0 | 0.73 | 0.59 | 0.98 |
| | | Bin 2 | 0 | 0.53 | 0.44 | 0.49 |
| | | Bin 3 | 1 | 0.85 | 0.69 | 0.70 |
| | | Bin 4 | 0 | 0.12 | 0.21 | 0.88 |
| | | Bin 5 | 0 | 0.34 | 0.20 | 0.97 |
| | | Bin 6 | 0 | 0.64 | 0.82 | 0.67 |
| | | Bin 7 | 0 | 0.89 | 0.52 | 0.46 |
| | | Bin 8 | 0 | 0.03 | 0.33 | 0.15 |
| | | Bin 9 | 1 | 0.60 | 0.11 | 0.16 |
| | | Bin 10 | 0 | 0.76 | 0.53 | 0.01 |
| | Variable 3 | Bin 1 | 0 | 0.70 | 0.07 | 0.39 |
| | | Bin 2 | 1 | 0.06 | 0.68 | 0.84 |
| | | Bin 3 | 0 | 0.97 | 0.64 | 0.13 |
| | | Bin 4 | 0 | 0.71 | 0.27 | 0.00 |
| | | Bin 5 | 0 | 0.35 | 0.36 | 0.92 |
| | | Bin 6 | 0 | 0.68 | 0.40 | 0.32 |
| | | Bin 7 | 0 | 0.86 | 0.43 | 0.58 |
| | | Bin 8 | 0 | 0.19 | 0.95 | 0.37 |
| | | Bin 9 | 0 | 0.05 | 0.74 | 0.10 |
| | | Bin 10 | 0 | 0.93 | 0.96 | 0.18 |
| | Sub DE 1 | Missing | 0 | 0.88 | 0.50 | 0.23 |
| | | Option 1 | 1 | 0.44 | 0.15 | 0.26 |
| | | Option 2 | 0 | 0.19 | 0.99 | 0.09 |
| | | Option 3 | 0 | 0.30 | 0.16 | 0.96 |
| | | Option 4 | 0 | 0.28 | 0.37 | 0.37 |
| | Sub DE 2 | Missing | 0 | 0.19 | 0.03 | 0.38 |
| | | Option 1 | 0 | 0.12 | 0.31 | 0.89 |
| | | Option 2 | 0 | 0.59 | 0.74 | 0.38 |
| | | Option 3 | 1 | 0.01 | 0.45 | 0.41 |
| | | Option 4 | 0 | 0.12 | 0.79 | 0.61 |
| | Sub DE 3 | Missing | 1 | 0.14 | 0.76 | 0.57 |
| | | Option 1 | 0 | 0.02 | 0.78 | 0.55 |
| | | Option 2 | 0 | 0.65 | 0.58 | 0.20 |
| | | Option 3 | 0 | 0.83 | 0.99 | 0.75 |
| | | Option 4 | 0 | 0.41 | 0.00 | 0.62 |
| | | Results | | 2.16 | 3.11 | 3.03 |

Final Output= {Option 1, Option 3, Option 2}

FIG. 9C

OFFER SELECTION USING SEQUENTIAL SELECTION OPERATIONS

FIELD OF THE INVENTION

The present invention is in the field of serving offers to individuals, for example via the internet to users of web browsers. In particular, some embodiments of the invention are in the specific field of serving targeted offers, for example offers that are aimed at a particular group of respondents. A decision to serve an offer may be made automatically in real time and may utilize machine learning techniques to build and continuously improve a mathematical model used to predict which of a number of available offers an individual is most likely to respond to.

BACKGROUND OF THE INVENTION

Many web site providers use tools in order to personalize the appearance of a site to a visiting customer. One target of such personalization is to promote sales, for example by showing to a customer banners which the customer is likely to be interested in. There are many tools and technologies for finding a single option from a set of options to serve to a customer. Currently available tools can be of limited usefulness, for example, when there is a need to find the most appropriate combination of options which are selected from different independent sets. A non-limiting example of a combination of options, or offers, is in the area of holiday packages. Here it might be desirable for example to find the most appropriate resort together with the most appropriate length of stay and the most appropriate attractions. The resort may be selected from a set of all optional resorts, the length of stay is almost unlimited but could be chosen to be appropriate to a chosen resort. For example, if the resort is very far from the location of the potential customer, a long stay might be more appropriate than a short stay. Furthermore it is desirable for any chosen attractions to be appropriate to the location and length of stay.

SUMMARY OF THE INVENTION

Some embodiments of the invention provide methods and systems in which a selection decision from a large number of options is reduced to a series of individual selections from a smaller number of options, with the results of one or more previous selection decisions being used in subsequent decisions. Each selection decision may involve scoring a number of options, for example against certain criteria such as customer attributes, so that an option may be chosen on the basis of the score.

Some embodiments of the invention provide methods and systems for selecting a combination of two or more offers from a plurality of sets of offers to be served to potential respondents, for example as a combination. The selection of the offer combination may be carried out in a series of separate selection, or scoring, operations each resulting in the selection or scoring of one offer to be included in the combination, for example one offer from each set. Each operation may be carried out according to a respective model including one or more variables. The variables of the model for the second and any subsequent selection operation may include at least one selected offer from a previous selection operation.

According to some embodiments of the invention, each selection operation may be carried out in a respective decision engine. The decision engines may be linked. Thus the output of one decision engine, e.g. an offer selection, may be fed into the next decision engine for use in making the next decision, e.g. offer selection. The end result may be two or more offers to be served to a potential respondent in combination. The offers may be related to each other in some way, as in the example of holiday destination and length of stay.

The models may be updated using machine learning techniques. According to some embodiments of the invention each model may be separately updated.

Embodiments of the invention are not limited to the selection of offer combinations. According to some embodiments of the invention, a selection of a single item, e.g. offer, from a large number of options may be made by organizing the offers or items according to their characteristics. The characteristics, such as duration or location may each have a number of different possible values, also known in this art as outcomes. A series of separate decisions may be used to narrow down the selection, in which the selection of a first characteristic outcome is used as a criterion for the selection of a next characteristic value.

According to some embodiments of the invention, in a series of selection operations or decisions, the results of one or more earlier decisions or selections may be used to influence later selections or decisions.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 is a table showing an example of data that may be passed between decision engines according to some embodiments of the invention;

FIGS. 9A-9C show a detailed calculation of a three step linked decision engine according to some embodiments of the invention;

DETAILED DESCRIPTION OF THE INVENTION

Figure 1:
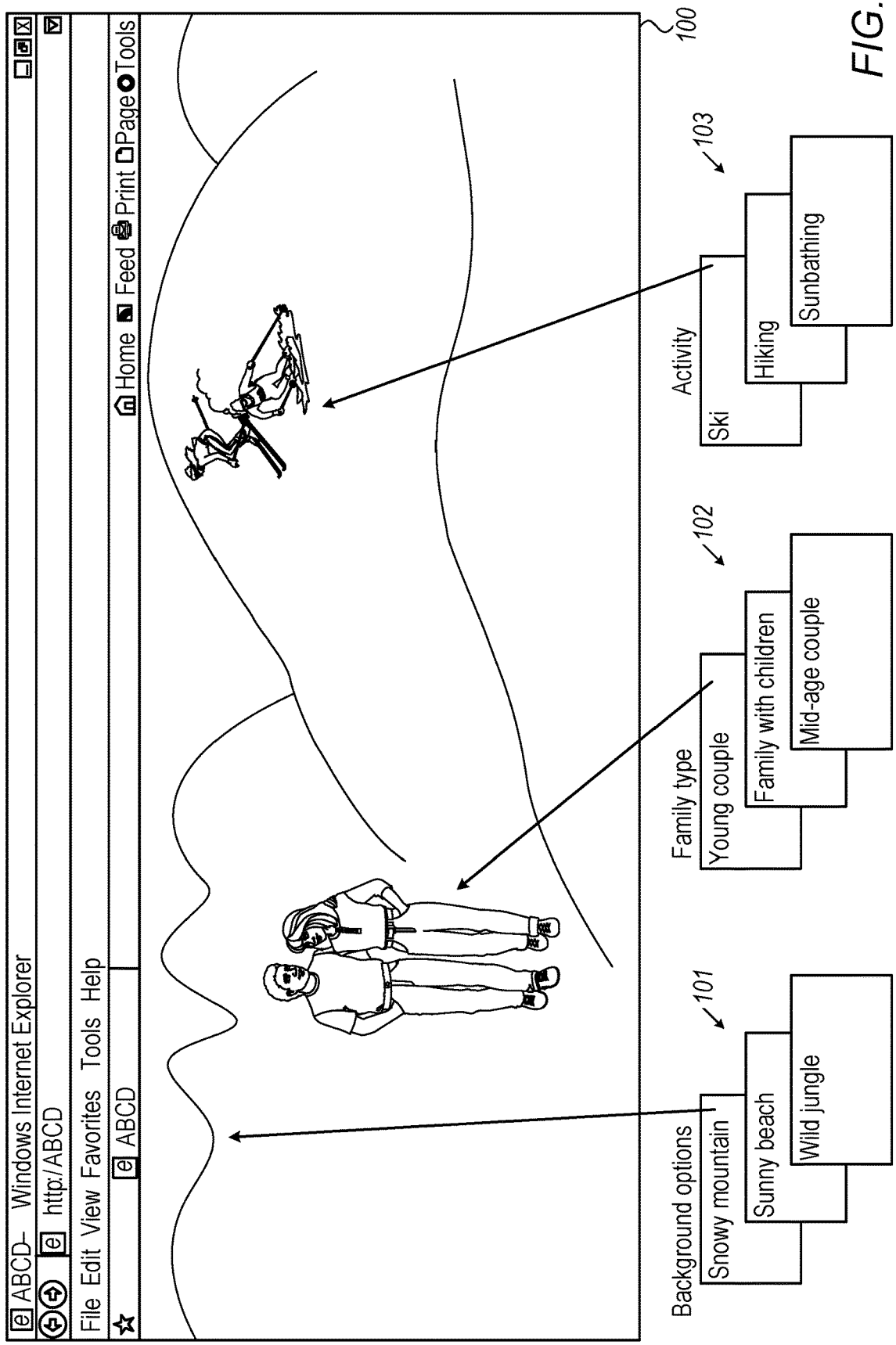
FIG. 1 shows a screen shot from a user interface via which an offer or combination of offers may be served to a respondent according to some embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

In some embodiments of the invention an "offer" denotes one of a number of alternatives or "options", available for presentation to a potential respondent. Examples of offer include but are not limited to offers for sale of a product or service, offers ancillary to an offer for sale such as a "buy one get one free" promotion or special price, or anything else that may be presented to a potential respondent to elicit a desired response. An offer may be made visually, for example by presentation on a web page, audibly, for example by reading or playing script to a potential respondent, or in any other way. An option can be considered to be a possible value of an offer selection operation.

"Respondent", or potential respondent may refer to a person or individual who is expected to respond to an offer. A non-limiting example of a respondent is a user of a web browser or interactive voice response "IVR" system other potential customer for a product or service that is being promoted via an offer.

"Responses" can be in various forms and at various levels. Thus examples of responses include "clicks" on a link on a web page, purchase of a product or other acquisition, e.g., within a predetermined time period, and a yes (or no) answer to a question posed or sentence read by a call center operator. These are not limiting examples and others will be apparent to those skilled in the art. Sometimes the term "response" is used to denote a positive response, for example in situations where a negative response to an offer is possible. It should also be noted that responses can be Boolean (e.g., for a betting website, whether or not a bet was made), integer (e.g., number of bets made) or real (e.g., total value of bets made).

An offer is said to be "served" to a potential respondent. The serving of an offer may take the form of presentation of a web page, in which case it is commonly referred to as an "impression". The serving of an offer may take the form of display in a part of a web page, for example designed to improve the sales of products or services being promoted via the web page. Other examples of serving of an offer include but are not limited to reading or playing a piece of text (script) to a caller, playing a piece of music such as an advertising jingle and mailing a flyer or advertising material, e.g., in paper form. A party serving an offer, or on whose behalf the offer is served, for example the party whose products or services are being promoted, may have available to it a number of different offers available to be served to a respondent, the selection of which may be according to various criteria such as one or more variables describing the respondent. Each variable may have several different possible values or outcomes such as states or events. For example, age may be represented by a number, marital status may have two or more states, and medical history may have one or more events.

"Response rate" may be measured as a ratio of responses to serves of a particular offer, but can also be measured in terms of number of responses in a unit time period, for example if the rate of serve is relatively stable. Number of serves and time period can be considered to be equivalent. Response rate can also be determined as a ratio of positive responses to serves, where negative responses are possible, or a ratio of positive responses to a total of non-responses plus negative responses.

"Standard error" StdErr is a well-known statistical parameter and may be used for example as a measure of confidence in a calculation. Where several calculations are performed, a standard deviation may be determined, with the standard error being related to the standard deviation StdDev by the equation: StdErr=Stdev/sqrt(n), where n represents the number of calculations used to determine the standard deviation. Thus the standard error decreases as sample size increases.

A "reward" may be the hoped-for response to an offer. It may be as simple as a click on an item on a web-page, or it may be measured in monetary terms such as the profit derived from a customer making a purchase in response to an offer.

FIG. 1 shows schematically a screen shot 100 from a user interface via which an offer or combination of offers may be served to a respondent according to some embodiments of the invention. The combination comprises a background showing snowy mountains to represent a destination, a young couple in the foreground to represent an offer for two people, and skiers in the middle ground for e.g. ski passes to be included in an offer. It may be accompanied by suitable text, not shown. This offer or combination of offers may have been compiled from a vast range of combinations of background, people, and activity, which may for example be stored in memory described with reference to FIG. 7. FIG. 1 shows schematically a range 101 of background options, a range 102 of foreground options, and a range 103 of middle ground options. Instead of making a single decision selection from all combinations or all available offers, according to some embodiments of the invention an offer or combination of offers may be selected according to a set of separate decisions. For example, the background, the nature e.g. age and/or number of the people, and the activity (skiing) may have been chosen in separate decisions. Thus the view shown in FIG. 1 may not be a compilation and may according to some embodiments of the invention be a single item chosen in a series of separate decisions according to different characteristics such as location, people and activity.

Some embodiments of the present invention may be used to personalize offers or offer combinations to respondents, for example via web sites. The personalization may be based on any of many variables including but not limited to profile (e.g. location of residence, age, gender and other variables) and past behavior (e.g. browsing history, products viewed). Based on this data a system, according to some embodiments of the invention, can suggest a single offer or an offer combination selected from a number of options for offers which is most suited for the current respondent, and/or learn from the reaction of the respondent in order to, for example, improve the selection next time. According to some embodiments of the invention, a system may be able to suggest a set or combination of options, each of which may be selected from a different domain, and/or the combination may be optimized as whole. For example, using an embodiment of the present invention, a website selling vacations may be able to design its landing page based on the specific visitor and show an image comprising the most appropriate background and the most appropriate people doing the most appropriate activity in a way that all options are optimized together.

The choice of offer combination can be three dimensional (background, people, activity). For example, suppose that the image in the landing page can comprise any of five types backgrounds (Snowing Mountains, Thick Forest, Yellow Beach, Urban Zone and Quite Dessert), three type people (Young, Middle age and Family with kids) and four types of attractions (Hiking, Biking, Swimming and Skiing). In this example, if the visitors are a middle aged man living in Israel, the landing page may show a middle aged man with his wife enjoying a ski in the snowing mountains. For this visitor the most desired response may not result from the landing page showing young people biking or swimming and in the background snowing mountains. Some embodiments of the invention are unlimited in the number of dimensions that may be used to select an offer to be served to a potential respondent. Each dimension may represent one offer to be included in a combination of offers and/or a characteristic of a single offer.

According to some embodiments of the invention an automatic learning process automatically learns, that some offer combinations are more effective than others to generate desired responses, for example, that skiing generates the most desired responses when shown with a view of snowing mountains. It may be possible to devise rules in order to avoid, to a certain extent, combinations which are obviously not appropriate, such as playing golf in snow. However this is not a simple matter when there are many dimensions to be taken into consideration. Thus according to some embodiments of the invention a choice of an offer or combination of offers may be made by a series of separate offer selection operations. These separate selection operations may operate according to a machine learning process implemented for example using a computer algorithm, and may according to some embodiments augment simple, e.g. fixed rules.

In the foregoing examples available landing pages may already be categorized by background, people, and activity. Some embodiments of the invention may be used to make a selection from a very large number of options which are not already categorized, for example by grouping the options into categories and making a selection from each category to arrive at a choice of one of the options, thereby saving on processing power. Thus for example a single image to be served to a respondent may be regarded as a combination of offers, or features, and the selection of one image may be performed in a series of linked decisions.

In order to determine which offer to serve, e.g., display to a particular respondent, a system according to some embodiments of the invention may "score" each of the available offers against various factors including but not limited to what is known about that respondent. The knowledge of the respondent may comprise an value for one or more variables characterising the respondent such as age, nationality, height, etc. which may have more or less relevance and be accordingly weighted depending on the nature of the offer. The score may be in terms of a predicted reward resulting from the serving of the offer. For example, the system may predict the value in monetary terms of displaying each offer to that particular respondent. For example, if there are 3 offers, A, B and C, then the system may predict that a display of A is worth $500, a display of B: $520 and a display of C: $480. The system will then usually display B because B has the highest score or value.

An example of a method for selecting a combination of offers, as opposed to a single offer, is to unify all dimensions of offers into one large set in which each option is a combination of options from each dimension, and select a combination based on a score. Due to the processing power required, this method is limited in terms of number of dimensions and number of options in each dimension.

According to some embodiments of the present invention, a combination of offers may be selected using a set of linked decision engines. Each decision engine may operate according to a model which may be updated, e.g. at regular intervals, using machine learning. The manner in which the decision engines are linked and/or the order in which they operate may be also be updated, e.g. at regular intervals, using machine learning. In some embodiments each decision engine as a decision engine as is known in the art. It should be noted that a "decision" by a decision engine according to some embodiments of the invention may be a selection of a single item from a set of items. According to some embodiments a decision may be a set of respective scores for multiple items on the basis of which a choice or decision may be made, for example by another component in a machine learning system. Thus a decision engine may be said to perform a scoring operation.

Prior to describing a possible decision making system and process in detail, two possible contexts for decision making, or offer combination selection, will be described with reference to FIGS. 2A and 2B.

Figure 2A:
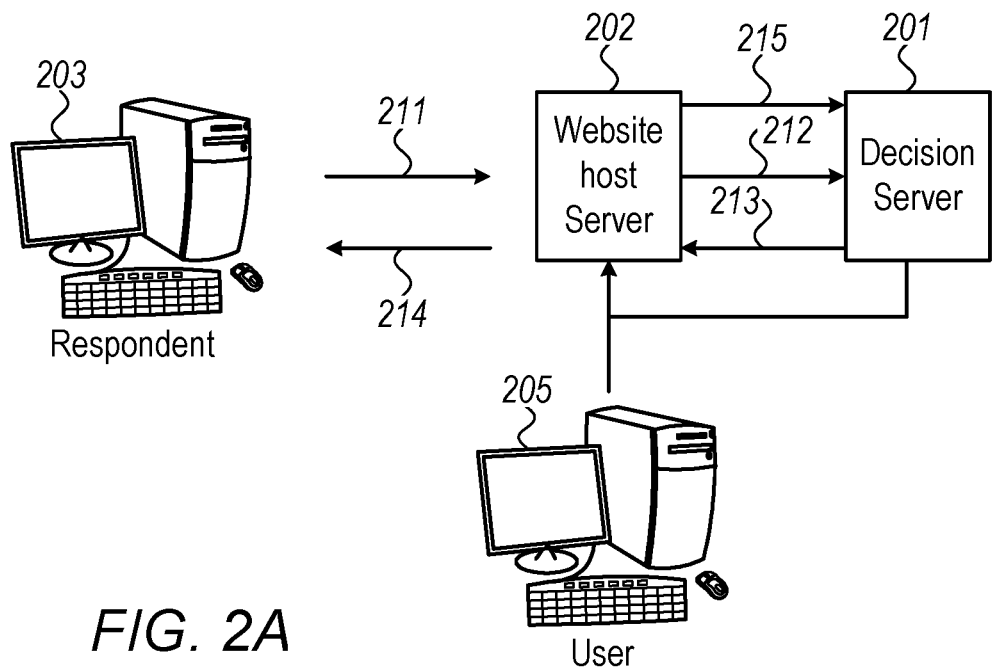
FIGS. 2A and 2B are schematic diagrams showing basic components of two alternative systems according to some embodiments of the invention.
Figure 2B:
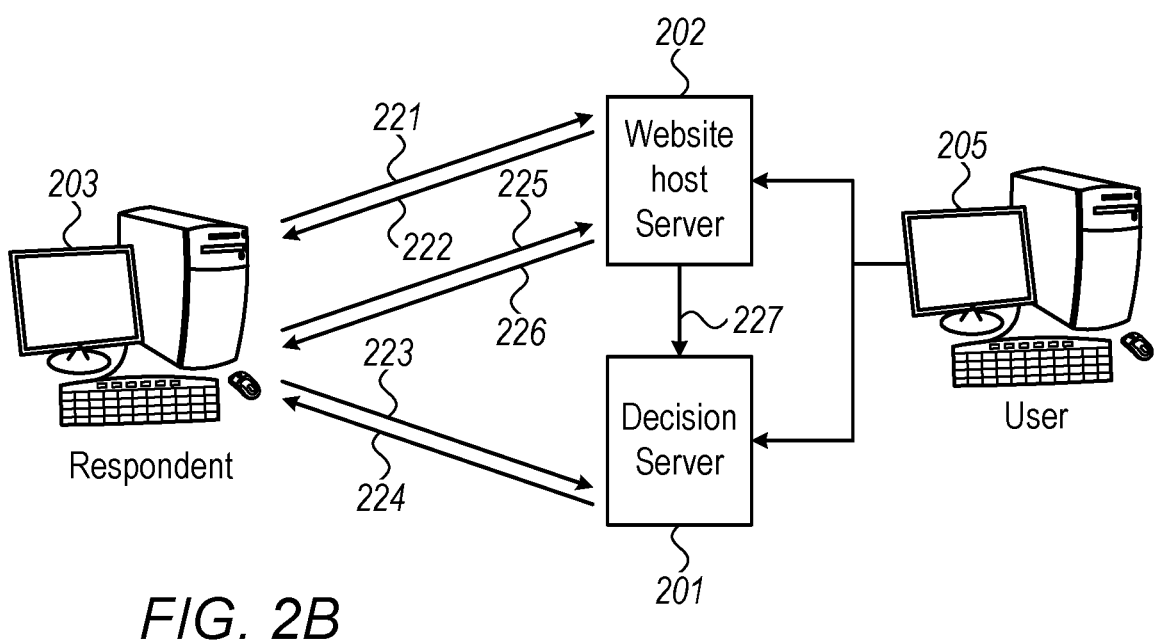

FIGS. 2A and 2B are schematic diagrams showing basic components of two alternative systems, according to some embodiments of the invention. Any of these components may include the computing system, or variations or parts of a computing system, such as that shown in and described with reference to FIG. 7. Each of the systems shown in FIGS. 2A and 2B comprises a decision server 201, a website host server 202 and a respondent device 203 which in this example is shown as a personal computer. It should be noted that the servers 201 and 202 need not be physically separate or self-contained components. They could be virtual servers or services on shared servers. The components of the systems shown in FIGS. 2A and 2B may communicate with each other in any way including wired and wireless connections over one or more local, wide area or global networks. A user of the system such as the owner of the website may have access to the website host server 202, for example remote access via a user device 205 such as a personal computer, and may use this to perform tasks such as updating of information on a website. The same user may have access to the decision server 201. In other embodiments of the invention, the web host server 202 may be replaced by a call centre server. In the case of a call center, the respondent device may be equipment used by the call center agent who records the response of the respondent during a telephone call. It should also be noted that a decision server such as server 201 may serve multiple web host servers or call centre servers or both, and therefore a system according to some embodiments of the invention may include one or more decision servers each serving one or more other servers. Also, a single user may require the services of more than one decision server, e.g., for a complex website it is possible that different parts may be served by different decision servers. Furthermore, according to some embodiments of the invention, the functions of any two or more of the system components shown in FIGS. 2A and 2B may be combined into one computing device or spread across more computing devices according to specific system requirements.

Figure 7:
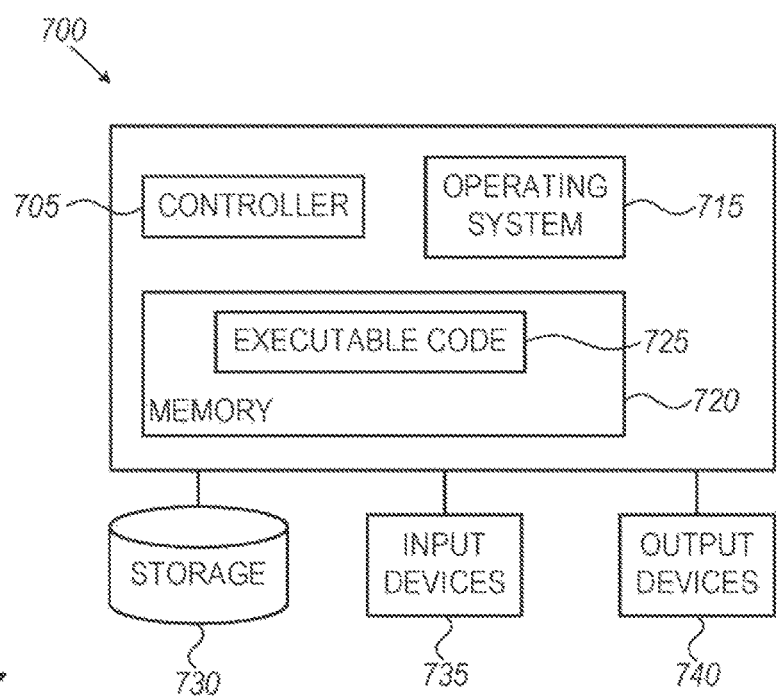
FIG. 7 is a schematic diagram of an exemplary computing device according to some embodiments of the invention.

Each of the servers 201 and 202 and the respondent and user devices 203 and 205 may comprise computing devices comprising one or more processors. An example of a suitable computing device is illustrated in FIG. 7.

A user may configure a system according to some embodiments of the invention, for example by loading options for offers, using an application programming interface "API" running on user device 201. The offers may be grouped in sets, each of which may correspond to a decision dimension. To take the holiday package example, there may be a set of destinations, a set of durations and a set of activities. Offers may be loaded to either server 201 or 202. An offer may be very simple and consist of a text string, or a more complex object such as an image, which will inform a calling application what to display to the respondent. The offer may be a hypertext mark-up language "HTML" or JavaScript Object Notation "JSON" fragment, possibly containing a URL, pointing to an image. The location may be the place where the offer combination is to be displayed. It may be an area of a web page, a desktop application in a call centre, a cashier's till at the point of sale in a retail store, or many other places.

A success criterion or goal may also be defined by a user so that the system can measure the success of each offer combination. The success criterion or goal may define the reward. This could be click through, product acquisition, revenue spent, or any other metric of interest. Whatever it is, whenever a respondent performs the behavior leading to the success criterion or goal, the decision server can receive this information to improve the accuracy of its predictions. The goal can be determined by a user configuring the system.

FIGS. 2A and 2B are two system diagrams showing the interaction of a decision server with a user and a respondent according to embodiments of the invention. Two modes of operation are illustrated. In FIG. 2A, the request for an offer combination comes from the website content management system. The request may not be an overt request for a combination. For example the request may be for a holiday package and the decision server may be configured to treat the request as a request for a set of separate offers resulting in a tailored package for the respondent. In FIG. 2B, the request comes from the browser during a page loading process.

Referring to FIG. 2A, possible information flows between the system components according to some embodiments of the invention may be as follows:

211—a browser application running on the respondent device 203 may request a page from a website hosted by website host server 202

212—the website host server 202 may send a request to the decision server 201 for a decision as to which offer combination to serve 213—in response to the request, the decision server 201 may return a decision to the website host server 202, this may be in the form of one or more JSON objects which may be interpreted by the website host server 202, for example the response from the decision server may include some or all options, which may be sorted from best to worst 214—in response to receiving the decision, the website host server 202 may determine how to use the options produced by the decision server 203 and serve a combination of offers to the browser at the respondent device 203

215—response data is collected by the website host server and fed back to the decision server 201 for use in future decision making It should be remembered that flows 213 and 215 may be asynchronous. It should be noted also that the website host server 202 may use different ones of the options produced by the decision server 203, and not necessarily the one or ones determined to have the highest scores, for example due to a problem with certain offers or offer combinations. An offer or combination of offers may be served in different ways, for example in the case of a visual serving it may be in the form of a banner, whole web page or any other visual presentation. Similarly, there are many options for audio or other forms of serving an offer or combination of offers.

In the foregoing example, the content of each offer combination may be stored at the website host server 202 and the decision server 203 may simply use identifiers for each offer combination. It is also possible, according to some embodiments of the invention, for the content to be stored at the decision server 201.

Referring to FIG. 2B, possible information flows between the system components is as follows, for an example where the offer combinations comprise different variations of the same webpage:

221—a browser application running on the respondent device 203 requests a page from a website hosted by website host server 202

222—website host server 202 returns the page with an embedded tag identifying a variable part of the page 223—when the page renders the tag signals the browser at respondent device 203 to request the decision for a decision as to which offer combination to serve 224—in response to the request, the decision server 201 returns an offer combination decision to the respondent device 203 This may be the actual content displayed or a reference to the actual content 225—if the respondent device 203 has received a reference to the actual content, it sends a request back to the website host server 202 for the content to display in the variable part of the page 226—in response to a request from the respondent device 203, the website host server 202 returns the content so that the complete page can be rendered by the browser on the respondent device 203

227—response data is collected by the website host server 202 and fed back to the decision server 201 for use in future decision making.

The response data may be used to determine an actual reward, achieved for example by the party serving the offer or offer combination. The determination of the actual reward resulting from the serving of an offer combination (or, for example if the reward is response rate, multiple serves of the offer combination) may be performed at the website host server 202, the decision server 201 or elsewhere. According to some embodiments of the invention, the reward is reported as a notification to a decisioning platform within the decision server 201.

It should be noted that, from the point of view of the respondent or other operator of respondent device 203, such as a call center agent, the communication between the website host server 202 and the decision server 201 may be invisible, and the respondent or call center agent, for example, may not be aware that this is happening.

In brief, respondents have various offers or offer combinations displayed to them as they interact with some third party application. Whether or not they interact with this content (e.g., click through, go on to acquire something, or whatever the optimization goal is) this may be recorded and notified to the decision server 201. A system according to some embodiments of the invention may learn that one offer, or offer combination, is more successful than the rest in terms of reward from a particular group of respondents, and this offer combination will then be preferentially served to this group in future. Therefore, future respondents, or the same respondents coming back, should generate improved rewards.

According to some embodiments of the invention, a decision server 201 may comprise a linked decision engine. A linked decision engine may comprise a set of decision engines linked to each other. A linked decision engine according to some embodiments of the invention may be implemented as a computing system comprising one or more processors programmed to implement a plurality of decision engines. Each decision engine may be programmed to make a selection from among a plurality of offers based on a plurality of input variables. For at least one of the plurality of decision engines the input variables may include a selection made by at least one other of the plurality of decision engines. Prior to describing a linked decision engine, an example of a single, or simple, decision engine which may be used in some embodiments of the invention will be described with reference to FIG. 3. The decision engine 301 may be used to make a decision in a single dimension. A system according to embodiments of the invention may comprise a separate decision engine 301 for each dimension. These may be combined in a linked decision engine. In the example of a holiday package, "destination", "length of stay" and "activity" are examples of dimensions.

Figure 3:
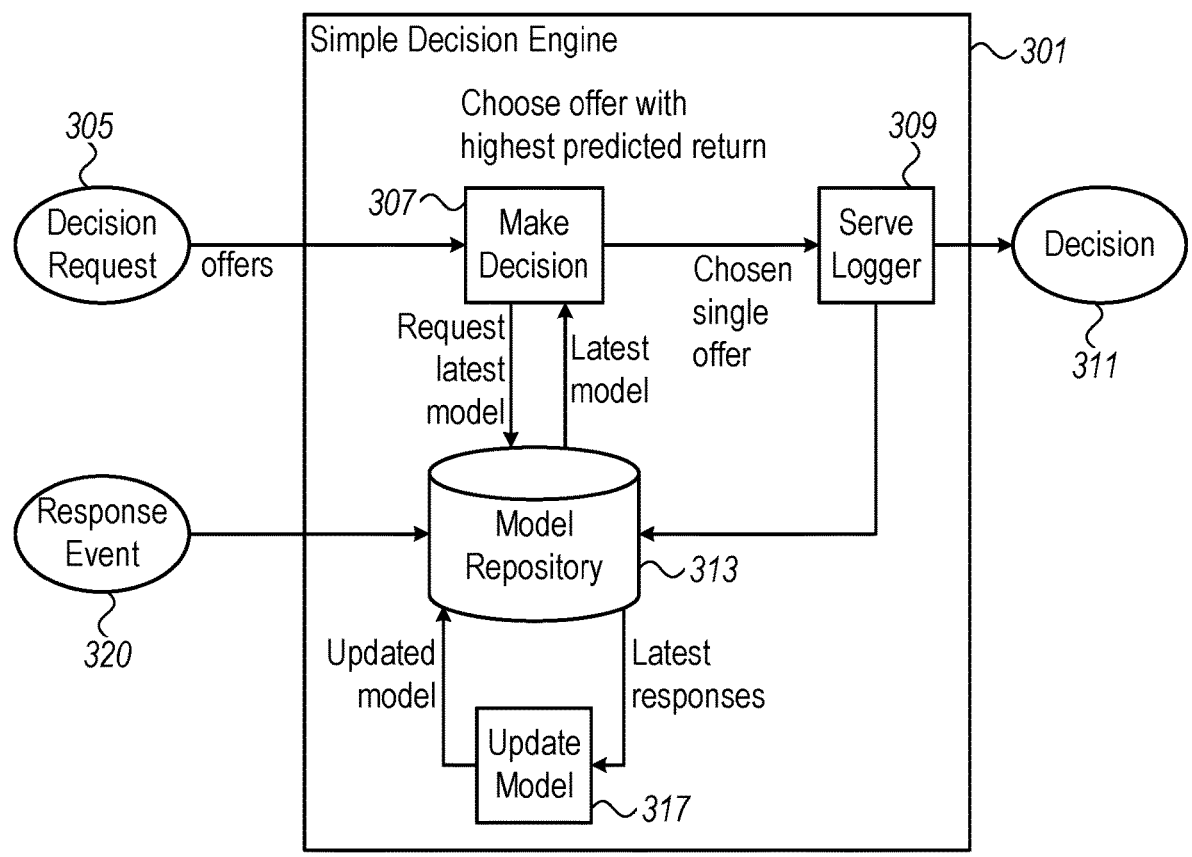
FIG. 3 is a schematic diagram showing details of a decision engine according to some embodiments of the invention.

The decision engine 301 shown in FIG. 3 may comprise a decision making module 307, serve logger 309, model repository 313 and model update module 317. The decision engine may operate according to a computer algorithm to select an offer from a set of offers, or to select an value for a characteristic. An example of a characteristic is color, which may have values red, green, violet and so on. A characteristic having a continuous range of possible variables may be organized according to a limited number of possible values, or "bins" as is known in the art. Another example of a characteristic is weather, which may have one of a limited number of different values such as "snow", "rain", "sunny" and so on. The decision engine 301 may receive a request for a selection of an offer, e.g. destination, from a set of offers e.g. set of destinations. The decision request is denoted 305 in FIG. 3. Decision request may for example be received from a website host server such as website host server 202. The request 305 may include a set of offers to be scored or from which a decision, or choice, is to be made by the decision engine. The request 305 may also comprise one or more variables, for example describing the customer, for example in a customer profile. The values for the variables may have been supplied as part of the request 305 or they may have been retrieved from the website host server 202 or the decision server 201 or elsewhere, depending on where customer profiles or other respondent data is stored. A predicted reward may be calculated for each offer in the set of offers. For example, all of the offers comprised in the request 305 may be scored against the values for the one or more variables, for example variables contained in the profile, where each score may be a prediction of the expected future reward from that particular offer being shown to the current customer. The scores are generated using a mathematical model, stored for example in model repository, that may be continually updated.

The calculated predicted rewards may be used to score each offer and thereby select which offer to be served to a respondent, for example as part of an offer combination. For example, the offer with the highest score may be chosen. The scoring and selection of an offer may be performed in the "Make Decision" module 307. Following the decision, an "impression", e.g., an instance of serving the offer, may be logged in a serve logger 309 for the chosen offer. A signal identifying the selected offer may be output to cause the selected offer to be served to a respondent. This is shown in FIG. 3 as the decision 311 being returned in response to the request.

Independently, positive response events, such as response event 320, may be received by a model repository 313 in which the model used to predict rewards may be stored. These response events may come from many places and may depend on the goal and the configuration. Some examples include but are not limited to:

If the goal is click-through on a web page, the click-through page could be tagged to automatically send an event to a decision server 201, in much the same way as packages such as Google Analytics™ record page-views in real-time.

If the goal is revenue, a client of the decision server 201 (e.g., the company running the website) may send a batch of events every night created from their purchase records.

When responses are received, an Update Model routine runs in update model module 317. In order to do this, the responses may be matched against any relevant offer impressions logged in serve logger 309.

Figure 4:
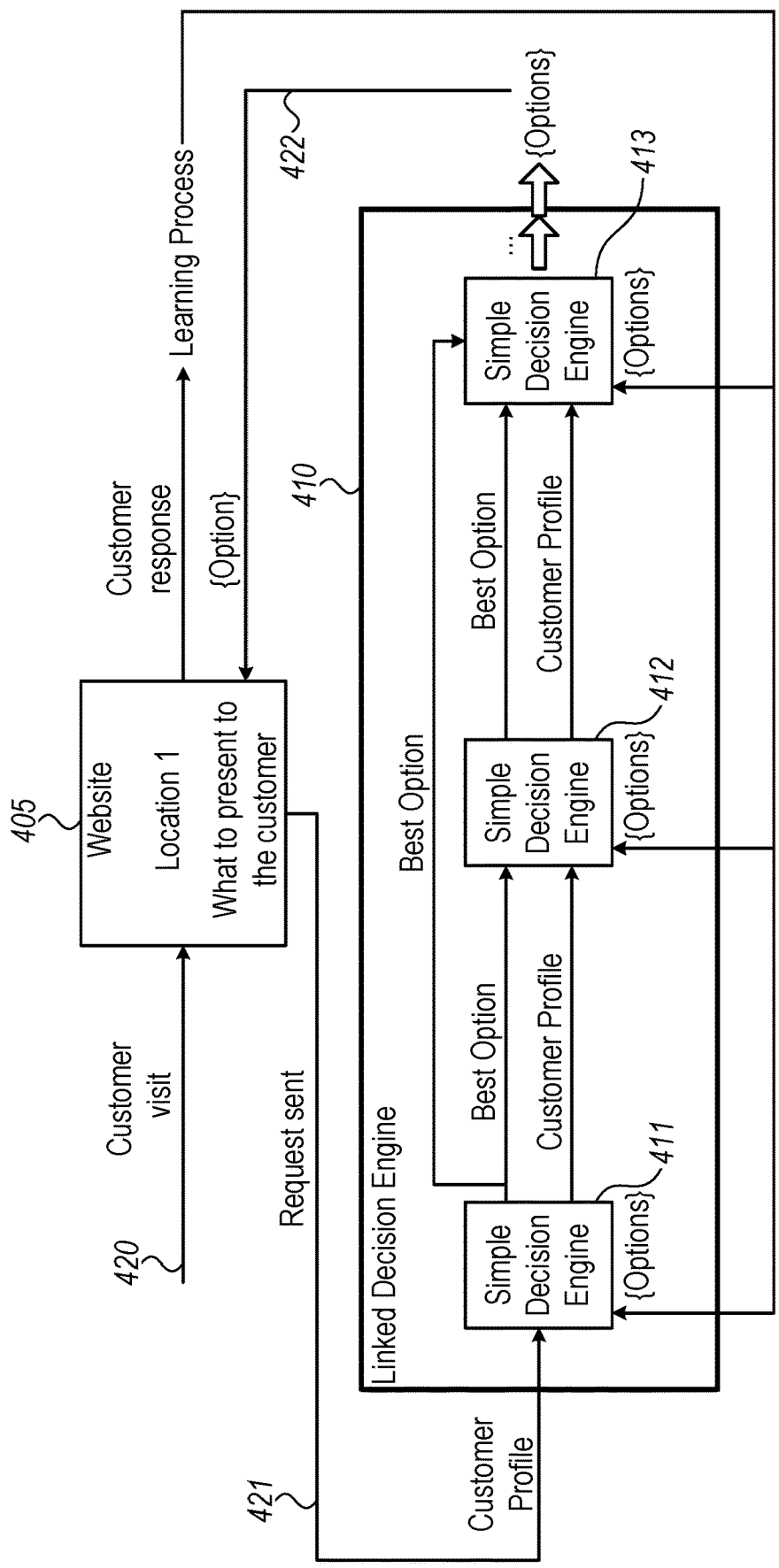
FIG. 4 is a schematic diagram of a system including a linked decision engine according to some embodiments of the invention.

FIG. 4 is a schematic diagram of a system including a linked decision engine according to some embodiments of the invention. The system shown in FIG. 4 shows a website 405, such as may be hosted at a website host server 202, and a linked decision engine 410 which may be part of a decision server 201. The linked decision engine is shown to comprise a plurality of individual decision engines 411, 412, 413 . . . , also referred to as "simple" decision engines. The decision engines 411, 412, 413 . . . may comprise one or more processors suitably programmed or configured to provide a plurality of decision engines. For example, a computer algorithm implemented by one or more processors may comprise a module or sub-routine implementing a simple decision function which is linked to other modules or sub-routines implementing other simple decision functions. Each of the individual decision engines 411, 412, 413 . . . may be configured to make a decision in one dimension and the output of the linked decision engine 410 may be a combination of offers. A decision by an individual decision engine may comprise a selection of a single offer to be included in an offer combination or a score for some or all of the offers included in the request. Each individual decision engine may be programmed to operate according to a respective mathematical model in order to make said selection, A decision by a linked decision engine may then comprise a selection of a single offer or offer combination or a score for multiple offers or offer combinations derived from scores determined from individual decision engines. Where the decision comprises multiple scores this may enable e.g. a website host server to determine which offer or offer combination to serve. The linked decision engine 410 may operate according to a computer algorithm, for example with each individual decision engine performing a sub routine within an overall process.

In a manner similar to the message flows described with reference to FIGS. 2A and 2B, a potential respondent, such as a customer for goods or services, may visit a website, e.g. land on a web page, as indicated by arrow 420, and in response the website host server 202 may request a decision, e.g. offer selection or offer combination selection, from a decision server 202 as indicated by arrow 421. The website host server 202 may provide customer profile information and/or other information to be used in the decision as to which combination of offers should be served to the customer. For example the customer profile may include values for variables describing the customer such as age, height, weight, male/female, etc. This customer profile may be used by all of the simple decision engines within a linked decision engine. Alternatively one or more of the simple decision engines may use only a subset of the variables in a customer profile and different decision engines may use different subsets of variables.

The customer profile and other information received from the website host server may be supplied to each of the simple decision engines 411, 412, 413 . . . that form the linked decision engine 410. This may be done in series as shown in FIG. 4 from one simple decision engine to another, or in parallel. Each simple decision engine may operate to make a selection from a number of available offers to be served to the customer. The output from each simple decision engine may be the best of a number of options according to a model used by the respective simple decision engine or a set of scores for multiple options. The decisions of the simple decision engines may be made one after another, and the result of each previous decision may be input to each decision engine that has not yet output a decision. Thus in the example shown in FIG. 4, a first decision may be made by decision engine 411, a second decision may be made by decision engine 412 and a third decision may be made by decision engine 413. The output of decision engine 411 may be provided as an input to decision engines 412 and 413, and the output of decision engine 412 may also be provided as an input to decision engine 413. Thus the linked decision engine may perform a series of successive or consecutive scoring operations. This simple example of three decision engines may be scaled up for any number of decision engines.

Each model may include a plurality of variables. At least some of the variables, such as variables describing potential respondents, may be included in all of the models. According to some embodiments of the invention, the models for at least some of the simple decision engines may include the same variables, and differ for example in terms of the weight given to different variables. According to some embodiments of the invention, the model for each decision engine includes as a variable a selection made by each of the other decision engines. According to some embodiments, the decision engines may operate in any order and any decision engine may take into account any previously made decision or selection by another decision engine in response to the same decision request. According to some embodiments of the invention, a decision making process is repeated with the individual decisions being made in different orders. Some such embodiments are described with reference to FIG. 13.

The output of the linked decision engine 410 may be a combination of offers, for example derived from the outputs of the respective decision engines 411, 412 and 413, or a set of offers or offer combinations with respective scores. This output may be supplied to the website host server 202 as indicated by arrow 422 in FIG. 4. The website host server may feedback customer response information to the linked decision engine 410, similar to flow 215 in FIGS. 2A and 2B. This customer response information may be supplied as an input to each individual decision engine 411, 412, 413 . . . and may be used in a machine learning process in each of the decision engines 411, 412, 413 . . . for example as described with reference to FIG. 3. Thus the linked decision engine may be configured or programmed to receive a response to the serving of an offer or set of offers selected by the plurality of decision engines, and to update the mathematical models used in the respective decision engines according to the response.

In methods and systems according to embodiments of the invention, each decision engine 411, 412, 413 . . . may implement a prediction function, for example in the form of a mathematical model, which may be capable of scoring different offer options, for example based on a vector of inputs. The output of each decision engine may be a single option. This may be the option with the maximum or minimum score. The output option may be selected from a closed set of options. Each decision engine may incorporate learning capabilities, for example as explained with reference to FIG. 3. For example, each model may include an error function in which a prediction is compared to an actual result to determine an error. Each decision engine may have an update function such as the update model module 317 which may for example receive an error as input or calculate the error and change the prediction function or other model according to which a decision is made, in order that the error will be lower in the next iteration of decision making The decision engines 411, 412, 413 . . . may feed forward the other decision engines "in line", for example to the other decision engines that have not already output a decision. The selected option or other result from one decision engine may then become an input to the next engine or engines which, together with other input information, for example customer profile information, selects an option from its set of options such as the highest scoring option. According to some embodiments of the invention, the model for each decision engine may include as a variable a selection made multiple other decision engines, in some embodiments all other decision engines.

The order in which the engines output decisions has an influence on which options are selected. Therefore, according to some embodiments of the invention, all permutations of possible running orders may be tried. According to other embodiments, a smaller number of permutations, which may be randomly selected, may be used and has been found in experiments to lead to a good offer combination which gets closer to the optimal combination as learning progress. In order to avoid convergence to a local optimum, rather than always choosing the option determined by a model such as the highest scoring options, some random selections may be made for a small proportion of serves. This is known in the art as exploration. For example, in some cases where a specific offer (single offer, not a package) is significantly preferred over the other offers by most of the population but not for a small minority group of users, a decision making system may become stuck in a state in which it offers everyone that preferred offer and does not distinguish the minority group. In order to overcome this situation for a small proportion of serves an offer may be selected randomly rather than using what the system found as optimal. In this way the system can "learn" that other offers are better for some users and may get out of the state it was stuck in. According to some embodiments of the invention, individual decision engines comprised in a linked decision engine may be independent in conducting such explorations.

Eventually, a list of selected offers, one from each decision engine, may be output from the system, for example as a recommended combination. Alternatively the output may comprise multiple offers or offer combinations with respective scores. The outputs from the respective decision engines may be collected at the final decision engine as shown in FIG. 4 or they may be output from the respective decision engines and collected by a separate component. The reaction of respondents to options may be sent back to each engine, for example from the website 405, and may be used for calculating any error in the decision making and may be used to update the model based on which the decision is made.

A mathematical model used to score options for offers to be presented to respondents may take various forms as is known in the art. One example of a mathematical model may be represented by a set of coefficients, otherwise known as weights, to be applied to a set of variables that is input to the model. Each variable may have an value which in some cases may be binary. In some models each variable-value combination may have a different weight.

The variables may relate to the respondent. According to some embodiments of this invention, the variables used in at least some models include one or more offers previously selected by one or more decision engines.

Figure 5:
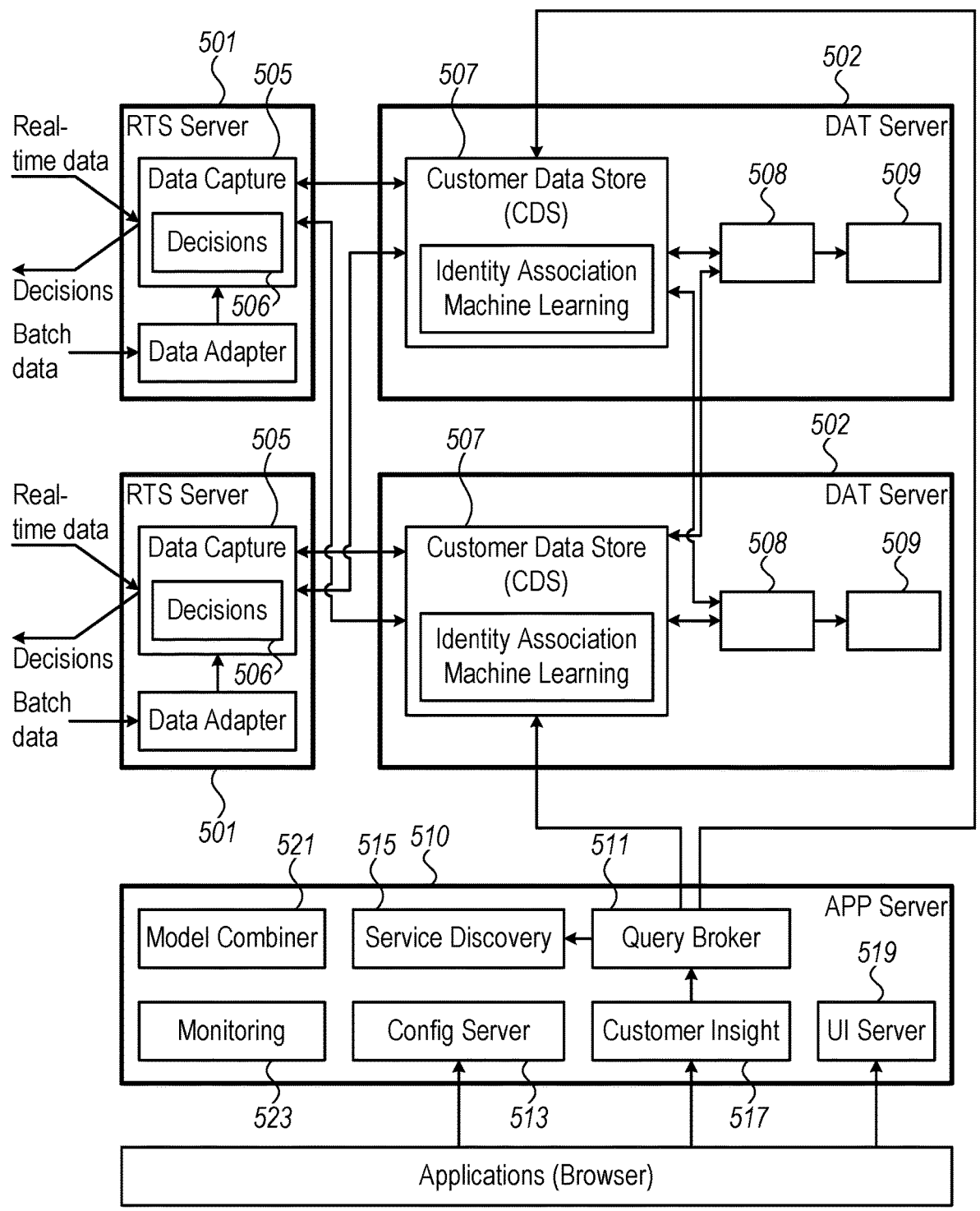
FIG. 5 is a schematic diagram of a system architecture according to some embodiments of the invention.

FIG. 5 is a schematic diagram of a system architecture of which systems according to some embodiments of the invention may form part. A system such as that shown in FIG. 5 may include multiple real time servers 501 and data servers 502. Two of each are shown in FIG. 5 by way of example. These may for example serve different sets of customers.

Each real time server 501, so called because it may perform operations in real time, may include a data capture component 505. Decision making capability, for example including a linked decision engine as shown in FIG. 4, may be included in the data capture component 505, for example in a decisions module 506. Thus the data capture components 501 may each be responsible for capturing data from external systems, making decisions, and returning the results of decisions, for example to external systems, for example website host servers such as those shown in FIGS. 2A and 2B. Each real time server 501 may include a data adaptor 503 providing a service for uploading external data to the data capture component. Such external data may include data that is not captured in other ways that may be provided in a system such as through visitors to a host web site.

Each data server 502 may include a customer data store "CDS" 507. The customer data store 507 may be a module responsible for managing the storage of customer data, and may be separate from the data store itself. For example the data may be stored in a database 508 operating according to a schema 509, such as a special big data schema as is known in the art. The management functions of the customer data store may include but are not limited to details of customer communication sessions, events such as but not limited to visits to specific web pages, purchases, clicks on some banners, served offers etc., and customer attributes. The customer data store may be responsible for executing queries such as but not limited to retrieving events for a specific customer, and building profiles, for example profiles of customers based on customer variables that may be used in decision making models. The customer data store may be responsible for identity association, for example associating a visiting customer with the correct profile. The customer data store may be responsible for updating machine learning models. Thus in the example architecture of FIG. 5, the functions of the update model may be part of a data server. In other possible embodiments these functions may be part of a real time server.

The example architecture shown in FIG. 5 also includes an application server which serves multiple data servers 502. The application server may comprise any one or more of:
a Query Broker module 511 which may be responsible for co-ordinating queries that retrieve data across the customer data stores;
a configuration server 513 which may be responsible for storing an entity configuration, such as might have been input via a user device 205 (or synchronizing this with data management in a larger system of which the architecture of FIG. 5 forms part), for storing system configuration, and for storing service configuration, any of which may be supplied by the configuration server to other components, for example if a data capture 505 needs to know the specific configuration of a certain decision engine it may send a request to the configuration server 513, this may run a configuration service and send back as response a system configuration which may for example contain the configuration of all decision engines contained in decisions modules 506;
a service discovery module 515 which may be responsible for maintaining information about which services are running, and allowing services to discover each other;
a customer insight module 517, which may be the back-end of a customer insight application which allows users to perform analysis on customer data;
a user interface "UI" server 519, which may be used to serves static resources (CSS, HTML, Javascript) for use by front-end applications running in a browser, for example at respondent devices 203;
a model combiner 521 which may co-ordinate machine learning model builds across customer data stores 507, and may combine these updates into a single model, for example if it is desired to learn from the interactions of all customers then information from all CDSs 507 may be included (if each CDS contains data for only some of the customers)—the model combiner 521 may send the model to the first CDS which may perform its own learning and then send the updated model (after the changes from the CDS) to the next, and so on for each CDS until a final model is sent to the data capture components 505;

a monitoring module which may monitors services via Simple Network Management Protocol "SNMP".

Figure 6:
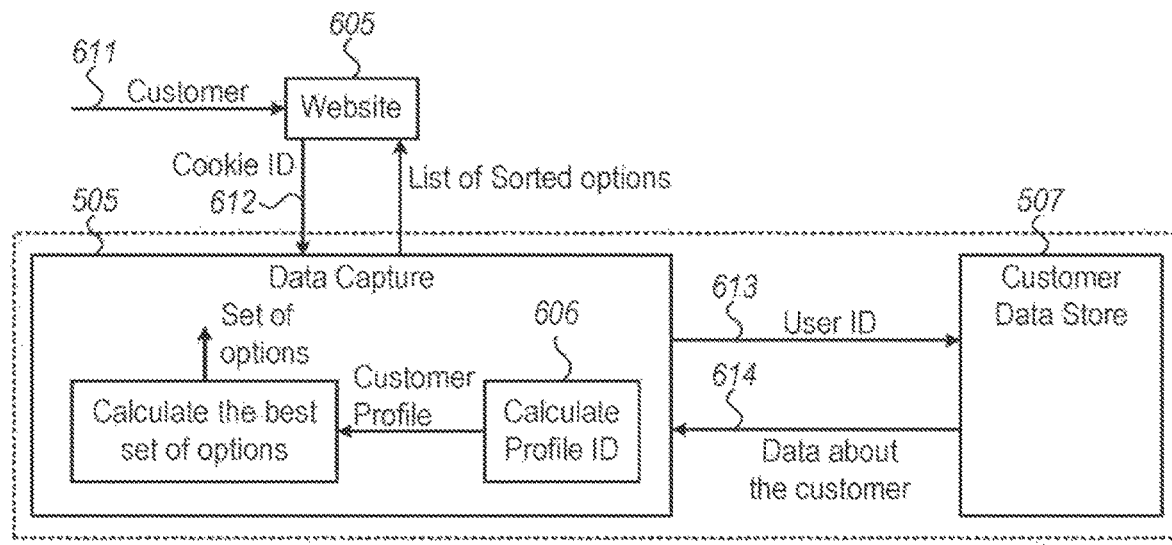
FIG. 6 illustrates possible functions of a data capture component in a system according to some embodiments of the invention.

FIG. 6 illustrates possible functions of a data capture component in a system according to some embodiments of the invention. When a user makes a visit to a website 605 as indicated by arrow 611, for example hosted at a website host server 202, his cookie identity may be sent to the data capture component such as component 505 in the system of FIG. 5 as indicated by arrow 612. The data capture component 505 may send a request to the customer data store component 507 to retrieve the existing data about the user, as indicated by arrow 613, which may be returned from the customer data store as indicated by arrow 614. The data capture component 505 may use the data to calculate a profile of the user, for example a set of features or variables, in a calculate profile ID module 606. At some later point a set of options, or offer combination may be selected for that customer, for example in a linked decision engine as described with reference to FIG. 4. This offer combination may be sent back to the website host server 202 to be displayed to the customer via the website 605.

Reference is made to FIG. 7, showing a high level block diagram of an exemplary computing device according to embodiments of the present invention. For example, linked decision engine 410 may be implemented in a computing device such as computing device 700.

Computing device 700 may include a controller 705 that may be, for example, a central processing unit processor (CPU), a chip or any suitable computing or computational device, an operating system 715, a memory 720, a storage 730, input devices 735 and output devices 740.

Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units. Memory 720 may for example store offers from which a selection may be made.

Executable code 725 may be any executable code, e.g., an application, a program, a process, task or script. Executable code 725 may be executed by controller 705 possibly under control of operating system 715. For example, executable code 725 may be an application implementing the functions of linked decision engine 410. Where applicable, executable code 725 may carry out operations described herein in real-time. Thus for example the selection of an offer may be performed in real time. From the point of view of a human user the selection may be instantaneous. Computing device 700 and executable code 725 may be configured to update, process and/or act upon information at the same rate the information, or a relevant event, are received. In some embodiments, more than one computing device 700 may be used. For example, a plurality of computing devices that include components similar to those included in computing device 700 may be connected to a network and used as a system. For example, the functions of linked decision engine 410 may be performed in real-time by executable code 725 when executed on one or more computing devices such computing device 700.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 730 and may be loaded from storage 730 into memory 720 where it may be processed by controller 705. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

FIG. 8 shows an example of the data that may be passed between decision engines, for example in a linked decision engine according to some embodiments of the invention. In this simple example there are three variables and four options from which each decision engine, denoted DE, may make a selection. The variables in this example are split into bins, for example in a separate process, for example according to their value. For example, variable 1 may be age range, and each bin may represent a ten-year range. This use of bins may result in a vector of binary values 1 and 0 in which one bin per value is 1 and all others are 0. In addition, the set of variables in this example includes a variable per decision engine in the chain. Thus for example in a linked decision engine with three simple decision engines the input to each decision engine may include an additional variable from one or more of the other decision engines. In the example data set shown in FIG. 8, three additional variables are shown. These three variables are split into bins representing the options available per decision engine and missing value. The missing value might for example denote a decision engine that has not yet made a selection.

The linked decision engine is shown in FIG. 4 to comprise of a chain of decision engines 411, 412, 413 . . . . Each decision engine may implement a learning algorithm. An example of a suitable learning algorithm is the well-known State-Action-Reward-State-Action or "SARSA" algorithm, described in several publications including the textbook by Richard S. Sutton and Andrew G. Barto, published in 2012 by MIT press, entitled "Reinforcement Learning: An introduction". This algorithm may be an implementation of reinforcement learning. The algorithm may calculates a score (Q) for each state (s) and action (a) combination. According to some embodiments of the present invention, the states may comprise input variables such as attributes from the customer user profile and offers selected or decisions made by the other decision engines. The actions may be the options from which a particular decision engine is to make a selection.

The SARSA algorithm may operate as follows:

---

Initialize Q(s, a) arbitrarily
Repeat for each episode (or iteration):
   Initialize s
   Choose a from s using policy derived from Q (e.g., $\varepsilon$ - greedy)
   Repeat (for each step of episode):
   Take action a, observe r, s'
   Choose a from s using policy derived from Q (e.g., $\varepsilon$ - greedy)
   $Q(s, a) \leftarrow Q(s, a) + \alpha [r + YQ(s', a') - Q(s, a)]$
   $s \leftarrow s'; a \leftarrow s;$
   until s is terminal.

---

FIGS. 9A-9C show a detailed calculation of a three step linked decision engine. In this example, the profile of a customer which is represented by a binary vector is multiplied by a weights vector for each option to create a score for each option. The option with the highest score may be selected and passed to the next decision engine which may perform the same process. Eventually, a set of selected options, or an offer combination, may be sent back to the client, for example in step 213 of FIG. 2A.

In the foregoing the decisions by the decision engines are described as selection of offers to form an offer combination. The use of a linked decision engine such as engine 410 is not limited to the selection of individual offers by each individual engine. According to some embodiments of the invention, each individual decision engine may make a selection of a characteristic of an offer to be served to a respondent, and the selection of characteristics may be used to select one or more offers from a set of offers.

According to some embodiments of the invention, the learning ability of a single decision engine may be used to learn not only what is the highest scoring option for the customer but what is the highest scoring option considering the options that were selected by one or more of the other decision engines. In this way very complicated problems with thousands of possible solutions may be solved in a simple and quick way by splitting the range of options into different dimensions. For example, to promote sales of cars, it is desirable to show to a respondent or customer the car that is most likely to encourage the respondent to go and buy a car or cars. Cars may have several characteristics such as color, type or model, and feature sets (e.g. luxury or basic). Each characteristic may be represented by a different value. A dealer may for example offer 5 different colors, 5 different models and 3 sets of standards or features. In order to know which image of car will convince the customer in the best way to buy a car, customers may be shown all possible cars (type, color, standard) and their reactions to each image may be noted for learning purposes. In this example there are 5*5*3=75 possible options of combinations, and a very large training period is required in order to learn which option is best. However by using a linked decision engine with a chain of three decision engines (one for color, one for type and one for standard) it is possible to get good solutions, e.g. offer selections, significantly faster and using less processing power. They may not be the best offer selections but they may represent a reasonable trade-off between the best result and conservation of time and processing power.

Applying the example of cars to the system shown in FIG. 4, decision engine 411 may make a selection among a first set of values for a first characteristic, e.g. car types. The selection of car type, e.g. sports car, may then be used in the selection of a value for a second characteristic, e.g. color. Thus a system according to some embodiments of the invention may learn that a sports car driver is more likely to choose a particular color. Therefore, the selection of sports car may be used as a variable by decision engine 412 in the selection of a color. The selection of color, e.g. red, and or the selection of type, e.g. sports, may be used as variable(s) by the decision engine 413 to select a feature set for a car or set of cars to be presented to a respondent. The outputs from the linked decision engine may be used to select all cars that have the values of characteristics selected by the respective decision engine. This may narrow the choice to a single car or to a set of cars.

Embodiments of the invention may enable learning of hitherto unknown relationships between variables and their characteristics. For example it may be known that those who prefer sports cars also prefer them to be red, but embodiments of the invention may reveal other links between characteristics, such as color and choice of feature set, that were not otherwise apparent.

The structure of the data that may be sent to the system, for example a request for a decision sent to a data capture component 505, may take the form of a URL in the following structure:
http://Host:Port/_datacapture/realtime/v5/
webdecision?idType=cookie_id&idValue=99999&
loc="location_name"

The response from the data capture component 505 may be a JSON object defining one more offers in the structure shown below in which each decision engine is denoted a "strategy". In this example the response comprises a list of values in order according to their respective scores. The actual scores are not included although in other examples they may form part of the response.

```
{
    "decisions": [
        {
            "location": "location-linked-strategy-id-",
            "strategy": [
                {
                    "options": [
                        "-option-23",
                        "-option-13",
                        "-option-43",
                        "-option-33"
                    ],
                    "strategyName": "sub-1-3"
                },
                {
                    "options": [
                        "-option-24",
                        "-option-14",
                        "-option-44",
                        "-option-34"
                    ],
                    "strategyName": "sub-2-4"
                }
            ]
        }
    ]
}
```

Figure 10:
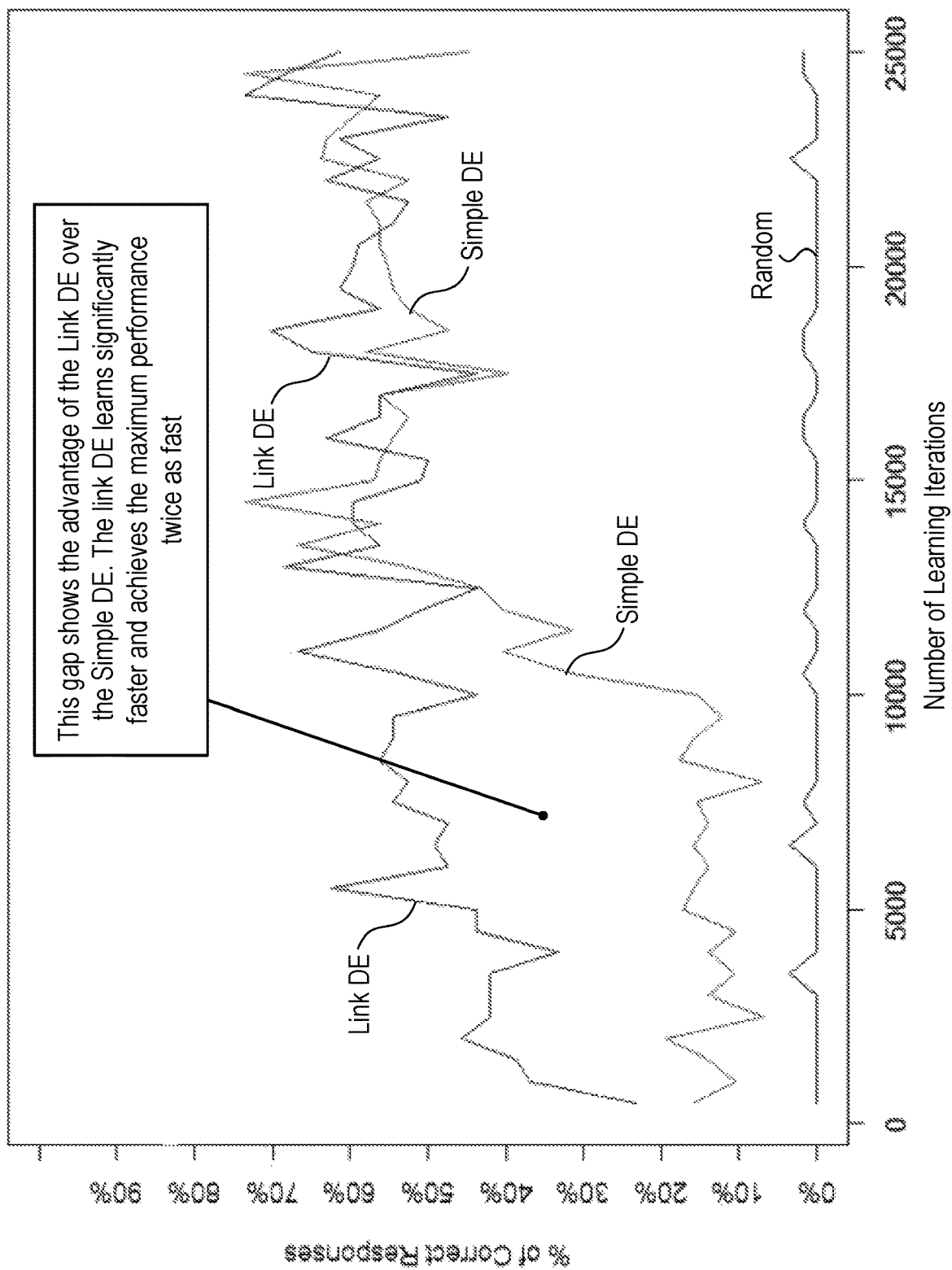
FIG. 10 shows a comparison of results obtained from a linked decision engine according to some embodiments of this invention, with a simple decision engine.

FIG. 10 shows results of a simulation of a linked decision engine according to some embodiments of the invention, compared to a simple decision engine and random choice of offer. In this simulation three separate decisions were used. The system started at a random state and learned to response the correct options to the respondent based on respondent profile. The simulation simulated a case in which there were 5 types of respondents that responded differently to different sets of offers. A set of offers was comprised of 3 options which were selected from different sets. Each user type had a different profile which was a vector of values representing the values of the variables.

The simulation was generating users randomly simulating visitors visiting the web site and the system responded with a set of options or offer combination based on a linked decision engine model. If the set of options fitted the user preferences, the simulations sent a positive reward to the model, if not, no response was sent. At the beginning the system using a linked decision engine responded randomly, and from iteration to iteration improved its response and learned which set or offer combination, was appropriate to which user. It can be seen that at the beginning the system using a linked decision engine responded correctly around 20% of the time, however it learned very fast and after 40 batches it responded correctly 90% of the times.

The large gap between the linked decision engine and the simple decision engine illustrates the advantage of the linked decision engine over a simple decision engine. In this simulation, the linked decision engine learned significantly faster and achieved the maximum result twice as quickly as the simple decision engine.

Figure 11:
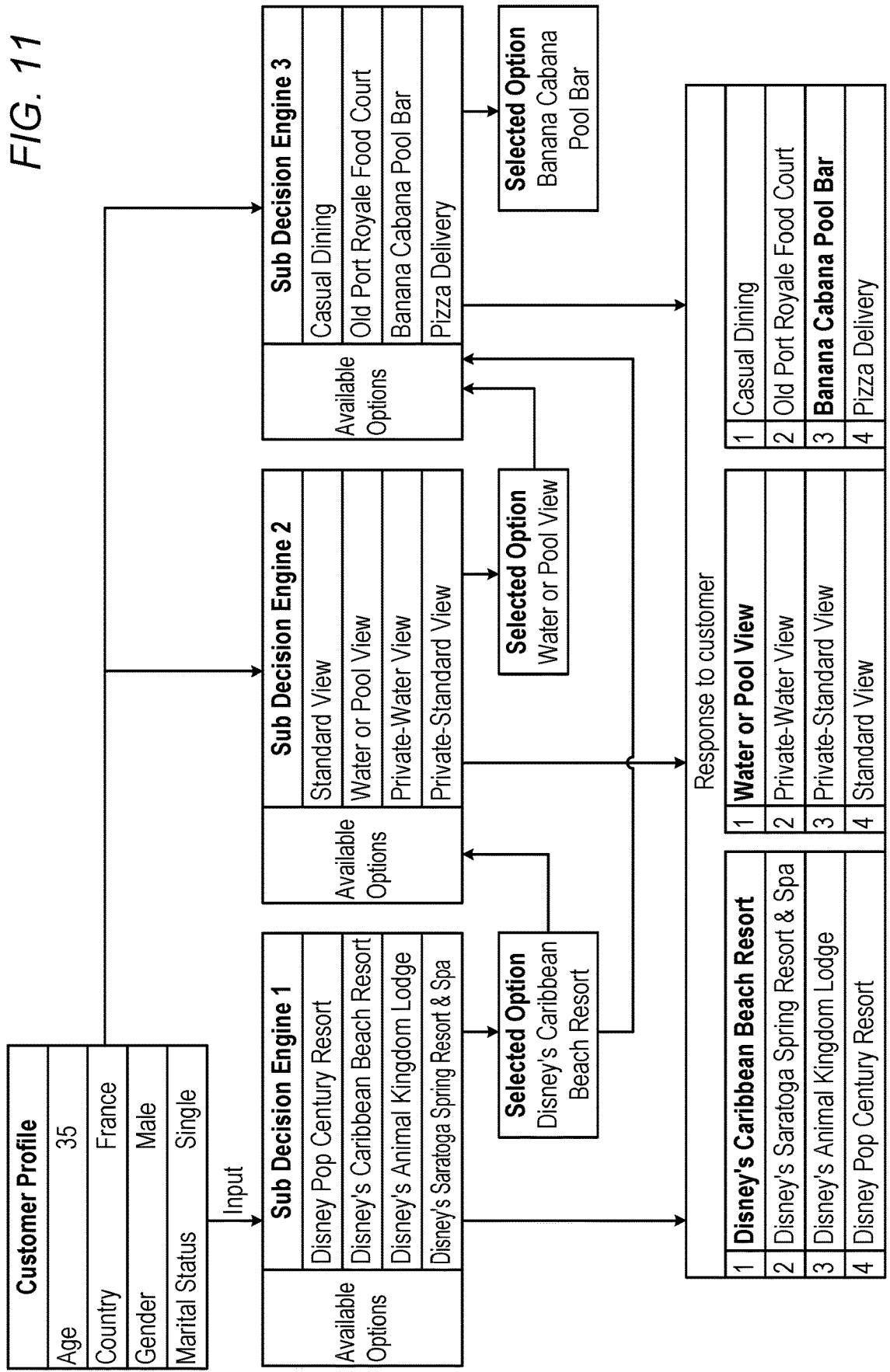
FIG. 11 shows a practical example of offer selection that may be carried out according to some embodiments of the invention.

FIG. 11 shows some examples of decisions that may be made by the linked decision engine shown in FIG. 4. FIG. 11 shows three decision engines, referred to as sub-decision engines, 1, 2 and 3 which may correspond to decision engines 411, 412, 413 shown in FIG. 4.

The sub-decision engines, also referred to above as simple decision engines, may each be supplied with the same customer profile. In this example the customer profile is shown to include four variables which in this example are attributes of a potential respondent: age, country of residence, gender and marital status. Each variable or attribute may have more than one possible value.

In the illustrated example the first decision is by sub decision engine 1 which makes a selection among hotel options. The selection, based on the customer profile, is the Disney Caribbean Beach Resort. This selection is used as an input to sub decision engine 2 and may also be used as an input to sub decision engine 3. The second decision is by sub decision engine 2 which makes a selection among available types of room. The selection, based on customer profile and the Disney Caribbean Beach Resort, is water or pool view. This selection is used as an input to sub decision engine 3. The third selection is by sub decision engine 3 which makes a selection among dining options. The selection, based on customer profile and water or pool view, is Banana Cabana Pool Bar. This third selection may also be based on the selection of Disney Caribbean Beach Resort by sub decision engine 1.

This series of selection operations each results in the selection of one offer to be included in a combination. The combination is also shown in FIG. 11 as the response to the customer. The combination comprises Disney Caribbean Resort, water or pool view, and Banana Cabana Pool Bar.

Figure 12:
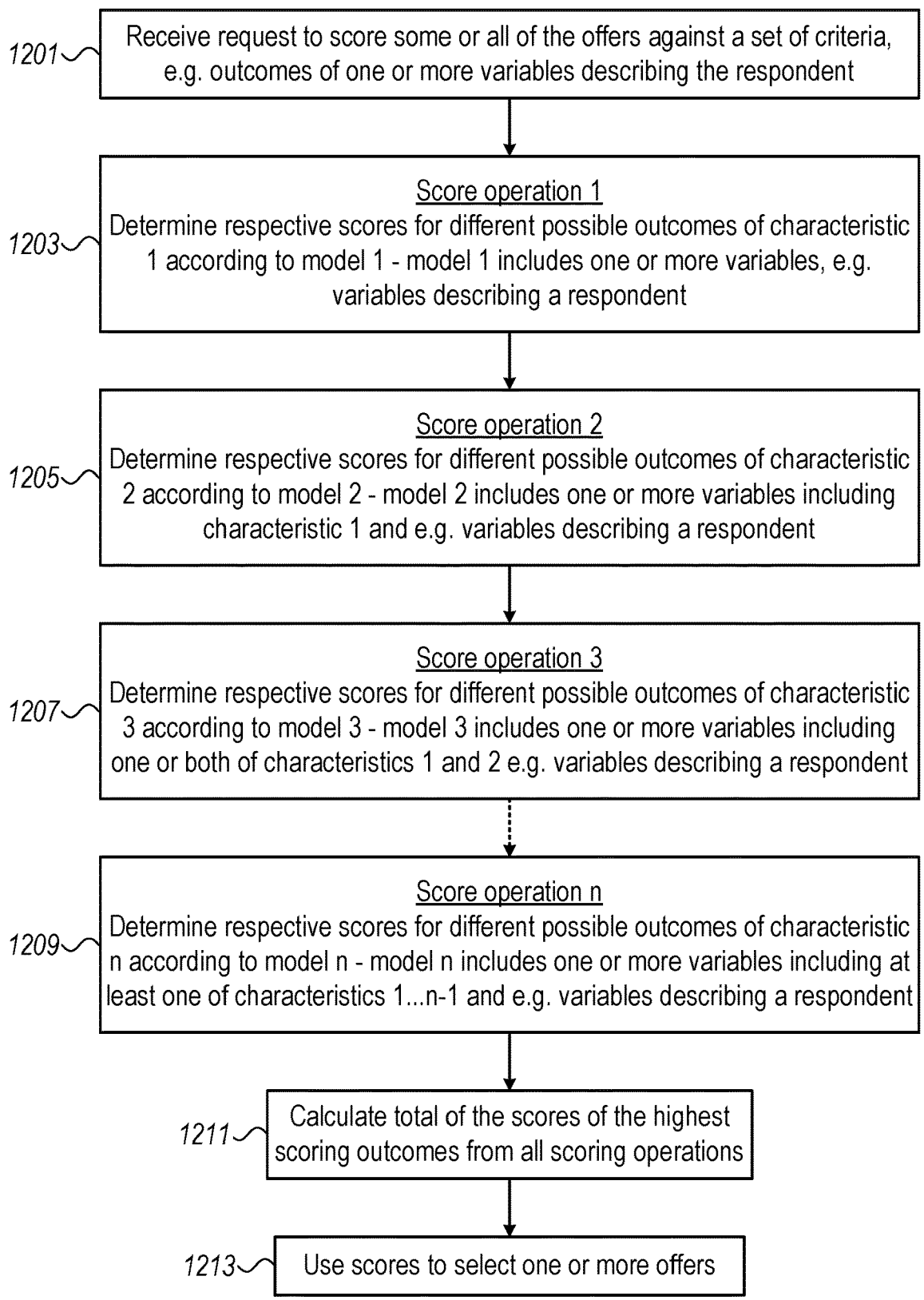
FIG. 12 is a flow chart showing a method of offer selection according to some embodiments of the invention.

FIG. 12 is a flow chart showing a method of selecting an offer or a combination of offers according to some embodiments of the invention.

The operations shown in FIG. 12 may commence with operation 1201, the receipt of a request to score some or all offers in a set of offers, for example against a set of criteria. This may for example be a request sent from a website 405 to a linked decision engine 410 as shown in FIG. 4. The offers may have multiple characteristics and each characteristic may have more than one possible value. The set of criteria may comprise values of one or more variables describing the respondent. According to some embodiments of the invention, the request may be for a selection of two or more offers from a plurality offers, such as offers organized in sets to be combined as a package.

In response to the request a series of scoring or selection operations may be performed, for example at respective decision engines in a linked decision engine such as engine 410 of FIG. 4. Each operation may be carried out according to a respective model including one or more variables. The variables of the model for the second and any subsequent selection operation may include at least one characteristic scored in a previous scoring operation, or a selected offer from a previous selection operation. Each scoring operation may comprise determining respective scores for different possible values of a characteristic of an offer.

FIG. 12 shows consecutive scoring operations 1-n. Any of the scoring operations of FIG. 12 may be selection operations resulting in the selection of an offer or offer characteristic.

The first scoring operation 1203 comprises determining respective scores for different possible values of a first characteristic, denoted characteristic 1, according to a respective model, denoted model 1. This model 1 includes one or more variables, e.g. variables describing a respondent. The models included in model 1 may include characteristics scored in some or all of the other 2-n scoring operations. Since at this stage the other 2-n scoring operations have not been performed, these characteristics cannot be taken into account in scoring operation 1.

The second scoring operation 1205 comprises determining respective scores for different possible values of a second characteristic, denoted characteristic 2, according to a respective model, denoted model 2. Model 2 may include one or more variables including characteristic 1 and e.g. variables describing a respondent. Since scoring operation 1 has taken place, characteristic 1 may be used in scoring operation 2.

The third scoring operation 1207 comprises determining respective scores for different possible values of a third characteristic, denoted characteristic 3, according to a respective model, denoted model 3. Model 3 may include one or more variables including characteristic 1 and/or characteristic 2 and e.g. variables describing a respondent. Since scoring operations 1 and 2 have taken place, characteristics 1 and 2 may be used in scoring operation 3.

The series of scoring operations may continue with any number of scoring operations until a final nth operation 1209. The result of any of the 1 . . . n-1 scoring operations may be fed into one or more subsequent scoring operations. According to some embodiments of the invention, the variables of the model for the second and any subsequent scoring operation may include respective results of all previous scoring operations in the series of scoring operations. The result of each scoring operation, which may be fed forward to a subsequent scoring operation, may be the highest scoring value for the respective characteristic. For example, at each scoring operation, the scores for the values may be ordered from highest to lowest and the highest scoring value may be passed to the next decision engine or engines. The highest score and the ordered list may both be stored in memory such as memory 720.

Operation 1209 comprises determining respective scores for different possible values of characteristic n according to model n. Model n includes one or more variables including at least one of characteristics 1 . . . n-1 and e.g. variables describing a respondent.

The variables used in the respective models may include the characteristic values scored in all of the other models, or only some of the other models.

The series of consecutive scoring operations may be followed by calculation of the total of the scores of the highest scoring values from all scoring operations at operation 1211. The scores (not necessarily the highest scores) may be used to select one or more offers at operation 1213.

The highest scoring values may be output as the final result of a process according to some embodiments of the invention. These may denote a unique combination of offers, for example a holiday package. Alternatively they may denote a set of characteristics of e.g. a car and more than one offer, e.g. car, may have these characteristics. Thus a method according to some embodiments of the invention may terminate with selecting one or more offers to be served to a respondent having the values of characteristics selected in the highest scoring series of scoring operations.

Not all respondent variables need to be used in all of the respective models used for scoring. At least some of the variables describing the respondent may be included in at least some of the respective models used in the scoring operations. Some may be used in all scoring operations.

FIG. 12 shows a single series of scoring operations. Some embodiments of the invention comprise performing at least one subsequent series of said scoring operations in which the order of carrying out the operations is different from the order of carrying out the operations in the previously performed series of scoring operations. In other words, the scoring operations may be carried out in different permutations. Any number of different permutations may be performed.

Figure 13:
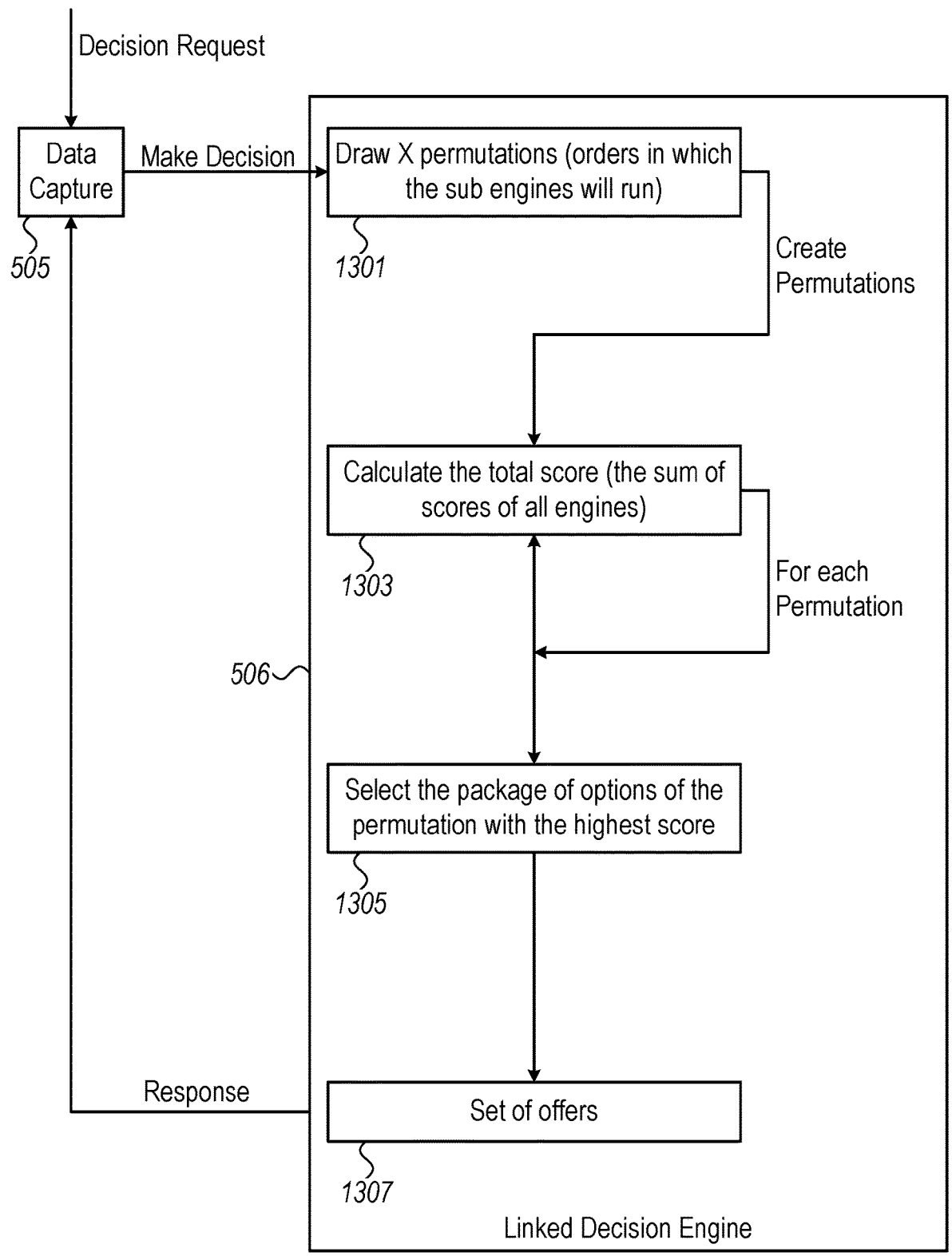
FIG. 13 is a flow chart showing a method according to some embodiments of the invention of selection using more than one series of selection operations with each series being performed in a different order.

FIG. 13 is a flow chart showing a method according to some embodiments of the invention of selecting a combination of offers, or package of options, using multiple permutations of running order of individual decisions.

The method shown in FIG. 13 commences with a request to make a decision, similar to operation 1201, being received at a data capture component 505. The data capture component may then send a "make decision" request to a linked decision engine, for example in a decisions module 506.

A process within decisions module 506 may commence with a number X of permutations of scoring or selection operations being selected or drawn at operation 1301. This may be a random process. The number X may have been stored in a configuration file in the configuration server 513. After the creation of the permutations, for each permutation the total score, or sum of the scores of individual engines, may be calculated. This may be done according to a process similar to operations 1203-1211 described with reference to FIG. 12. Next, in operation 1305 a package of options, or combination of offers, with the highest score may be selected to produce a set of offers for presentation to a respondent at operation 1307.

It should be noted that operation 1307 may be carried out at a website host server. According to some embodiments of the invention, a client such as a website host server 202 may receive a response from the decision server 201 in the form of an ordered list of values per decision engine or scoring operation, for example as shown in the example JSON Object. From this the website host server 202 may choose to show any package of options to a respondent, for example in visual form on a screen. It is not obligated to show the top or highest scoring option from each individual decision engine or scoring/selection operation.

A system according to some embodiments of the invention may include components such as, but not limited to, a plurality of central processing units (CPU), e.g., similar to controller 705, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of selecting one or more offers to be served to a respondent from a set of offers having multiple characteristics, wherein each characteristic has more than one possible value, at least one characteristic corresponding to a location, the method being performed using one or more processors in a computing system, wherein the method of selecting comprises:

at a hardware-based website host server operating at least one processor of the processors serving one or more offers to a respondent device operating a processor;

collecting response data relating to the offers at the website host server and transmitting the response data to a hardware-based decision server operating at least one processor of the processors;

receiving at the decision server, from the website host server, a request to score some or all of the offers against a set of criteria;

in response to the request:

performing in real time a series of at least three successive scoring operations, wherein:

each scoring operation of the series of successive scoring operations is performed by a decision engine executed by the decision server and comprises determining respective scores for different possible values of one of the multiple characteristics, three or more decision engines forming a linked decision engine;

each of the at least three scoring operations is carried out according to a respective reinforcement machine learning model including one or more variables and modified by response data, wherein each scoring operation comprises selecting the value for one of the multiple characteristics having the highest score and wherein the selected value is said result of at least one previous scoring operation used as a variable in one or more subsequent scoring operations; the location characteristic determining a location on a computer for the offer;

the one or more variables of the reinforcement machine learning model for at least a second scoring operation and any scoring operations subsequent to the second operation include scores for all characteristics scored in previous scoring operations; and a machine learning model for at least a second scoring operation and any scoring operations subsequent to the second operation scoring an additional characteristic not scored in previous scoring operations;

using the determined scores to select in real time one or more offers from the set of offers, the one or more offers being in the form of a web banner in a web page or a web page; and serving the selected one or more offers to the respondent device.

2. The method of claim 1 further comprising calculating the sum of the scores of selected values from respective scoring operations to derive a total score for the series of scoring operations.

3. The method of claim 1 wherein said set of criteria comprises values of one or more variables describing the respondent and at least some of the variables describing the respondent are included in at least some of the respective reinforcement machine learning models used in the scoring operations.

4. The method of claim 1 comprising performing at least one subsequent series of said scoring operations in which the order of carrying out the operations is different from the order of carrying out the operations in the previously performed series of scoring operations.

5. The method of claim 4 further comprising calculating the sum of the scores of selected values from respective scoring operations to derive a total score for each series of scoring operations.

6. The method of claim 5 comprising selecting one or more offers to be served to a respondent having the values of characteristics selected in the highest scoring series of scoring operations.

7. A computing system for use in performing a selection of one or more offers among a set of offers having multiple characteristics, comprising:

a hardware-based website host server operating at least one processor serving one or more offers to a respondent device operating a processor, the one or more offers being in the form of a web banner in a web page or a web page, the website host server collecting response data relating to the offers, and transmitting the response data to a hardware-based decision server operating at least one processor, the decision server receiving at from the website host server a request to score offers against a set of criteria;

one or more processors programmed to perform in real time a series of at least three selection operations each resulting in the selection of one offer by implementing a plurality of reinforcement machine learning-based decision engines, three or more reinforcement machine learning-based decision engines forming a linked reinforcement machine learning-based decision engine wherein each decision engine performs a scoring operation on a characteristic and selects the value of one characteristic having the highest score and wherein the selected value is said result of at least one previous scoring operation used in one or more subsequent scoring operations; the location characteristic determining a location on a computer for the offer, wherein each reinforcement machine learning-based decision engine is programmed to make a selection from among a plurality of offers based on a plurality of input variables, and wherein for at least one of the plurality of reinforcement machine learning-based decision engines the input variables include scores for all characteristics scored in previous scoring operations of decision engines and a reinforcement machine learning-based decision engine scoring an additional characteristic not scored in a previous scoring operation, at least one characteristic corresponding to a location;

the website host server serving the selected offer to the respondent device.

8. A computing system according to claim 7 in which each reinforcement machine learning-based decision engine is programmed to operate according to a respective mathematical model in order to make said selection.

9. A computing system according to claim 8 wherein each model includes a plurality of variables and at least some of the variables are used by all of the models.

10. A computing system according to claim 9 in which the model for each reinforcement machine learning-based decision engine includes as a variable a selection made by each of the other decision engines.

11. A computing system according to claim 10 in which the one or more processors are programmed such that the reinforcement machine learning-based decision engines may operate in any order and any reinforcement machine learning-based decision engine may take into account any previously made decision or selection by another reinforcement machine learning-based decision engine in response to the same selection request.

12. A method of selecting a combination of two or more offers from a plurality of offers having multiple characteristics to be served to potential respondents, the method being performed using one or more processors in a computing system,
wherein the method of selecting comprises:
at a hardware-based website host server operating at least one processor of the processors serving one or more offers to a respondent device operating a processor;
collecting response data relating to the offers at the website host server and transmitting the response data to a hardware-based decision server operating at least one processor of the processors;
receiving at the decision server, from the website host server, a request for a selection of a combination of two or more offers;
in response to the request:
performing in real time a series of at least three selection operations each resulting in the selection of one offer, each of the at least three selection operations being carried out according to a respective reinforcement machine learning model executed by a decision engine executed by the decision server and including one or more variables and modified by response data, each decision engine performing a scoring operation comprising selecting the value for one of the multiple characteristics having the highest score and wherein the selected value is said result of at least one previous scoring operation used as a variable in one or more subsequent scoring operations; the location characteristic determining a location on a computer for the offer;
three or more decision engines forming a linked decision engine, wherein the variables of the reinforcement machine learning model for the second and any subsequent selection operation include scores for all characteristics scored in previous selection operations, and a reinforcement machine learning model for at least a second selection operation and any selection operations subsequent to the second operation scoring an additional characteristic not scored in previous selection operations, at least one characteristic corresponding to a location;
outputting a signal identifying the selected offers; and
serving the selected offers to the respondent device.

13. The method of claim 12 wherein the offers of the plurality of offers are organized in respective sets, each selection operation is performed on a different one of the sets, and the combination of two or more offers comprises offers selected from different sets.

14. The method of claim 13 wherein the request includes values for one or more variables which are included in the respective reinforcement machine learning models for all of the selection operations.

15. The method of claim 14 wherein the variables included in the reinforcement machine learning model comprise characteristics of a particular respondent to whom the combination of two or more offers is to be served.

16. The method of claim 15 comprising performing at least one further series of selection operations, wherein each further series of selection operations is performed in a different order from any previously performed series of selection operations, and determining a score for each selected offer in each selection operation.

* * * * *